US011310521B2

(12) United States Patent
Sethuraman et al.

(10) Patent No.: US 11,310,521 B2
(45) Date of Patent: Apr. 19, 2022

(54) ERROR SURFACE BASED SUB-PIXEL ACCURATE REFINEMENT METHOD FOR DECODER SIDE MOTION VECTOR REFINEMENT

(71) Applicant: HUAWEI TECHNOLOGIES CO., LTD., Shenzhen (CN)

(72) Inventors: Sriram Sethuraman, Karnataka (IN); Jeeva Raj A, Karnataka (IN); Sagar Kotecha, Karnataka (IN)

(73) Assignee: HUAWEI TECHNOLOGIES CO., LTD.

( * ) Notice: Subject to any disclaimer, the term of this patent is extended or adjusted under 35 U.S.C. 154(b) by 0 days.

(21) Appl. No.: 17/100,924

(22) Filed: Nov. 22, 2020

(65) Prior Publication Data

US 2021/0076059 A1 Mar. 11, 2021

Related U.S. Application Data

(63) Continuation of application No. PCT/CN2019/092114, filed on Jun. 20, 2019.

(30) Foreign Application Priority Data

Jul. 2, 2018 (IN) .............................. 201831024666

(51) Int. Cl.
*H04N 19/513* (2014.01)
*H04N 19/523* (2014.01)
(52) U.S. Cl.
CPC ......... *H04N 19/513* (2014.11); *H04N 19/523* (2014.11)
(58) Field of Classification Search
CPC .................................................. H04N 19/513
(Continued)

(56) References Cited

U.S. PATENT DOCUMENTS

2011/0194610 A1* 8/2011 Xu ........................ H04N 19/523
375/240.16
2017/0142438 A1* 5/2017 Hepper ................ H04N 19/122
(Continued)

FOREIGN PATENT DOCUMENTS

| CN | 1882085 A | 12/2006 |
| EP | 1734769 A1 | 12/2006 |
| WO | 2016206748 A1 | 12/2016 |

OTHER PUBLICATIONS

Cheng Du et al., PPHPS: A Parabolic Prediction-Based, Fast Half-Pixel Search Algorithm for Very Low Bit-Rate Moving-Picture Coding. IEEE Transactions on Circuits and Systems for Video Technology, vol. 13, No. 6, Jun. 2003, 5 pages.
(Continued)

*Primary Examiner* — Yulin Sun

(57) ABSTRACT

Given that decoder side motion vector refinement/derivation is a normative aspect of a coding system, the encoder will also have to perform the same error surface technique in order to not have any drift between the encoder's reconstruction and the decoder's reconstruction. Hence, all aspects of all embodiments are applicable to both encoding and decoding systems. In template matching, the refinement movement occurs only in the reference starting from the sub-pixel accurate center that is derived based on the explicitly signaled merge index or implicitly through cost evaluations. In bilateral matching (with or without averaged template), the refinements start in the reference lists L0 and L1 starting from the respective sub-pixel accurate centers that are derived based on the explicitly signaled merge index or implicitly through cost evaluations.

20 Claims, 11 Drawing Sheets

(58) Field of Classification Search
USPC .................................................... 375/240.17
See application file for complete search history.

(56) References Cited

U.S. PATENT DOCUMENTS

| 2018/0139451 | A1* | 5/2018 | Maier | H04N 19/557 |
| 2018/0146208 | A1* | 5/2018 | Hojati | H04N 19/52 |
| 2018/0150962 | A1* | 5/2018 | Fletcher | G06T 7/337 |

OTHER PUBLICATIONS

Jing-Fu Chang et al,"A quadratic prediction based fractional-pixel motion estimation algorithm for H.264", Journal of Visual Communication and Image Representation, vol. 17, Issue 5, Oct. 2006, pp. 1074-1089, total 16 pages.
H.265,"High efficiency video coding", Feb. 2018, total 692 pages.
Wei Dai et al,"A Novel Fast Two Step Sub-Pixel Motion Estimation Algorithm in HEVC", 2012 IEEE International Conference on Acoustics, Speech and Signal Processing (ICASSP), Aug. 31, 2012, total 4 pages.
Jianle Chen et al,"Algorithm Description of Joint Exploration Test Model 1", Joint Video Exploration Team (JVET) of ITU-T SG 16 WP 3 and ISO/IEC JTC 1/SC 29/WG 11, 1nd Meeting: Geneva, CH, Oct. 19-21, 2015, Document JVET-A1001, total 27 pages.
Jianle Chen et al., Algorithm Description of Joint Exploration Test Model 7 (JEM 7). Joint Video Exploration Team (JVET) of ITU-T SG 16 WP 3 and ISO/IEC JTC 1/SC 29/WG 11, 7th Meeting: Torino, IT, Jul. 13-21, 2017, JVET-G1001-V1, 46 pages.
Emad Badry et al,"FAST Fractional-Pixel Motion Estimation Using Lagrangian-Based Error Surface Interpolation", 2017 IEEE Global Conference on Signal and Information Processing (GlobalSIP), Mar. 8, 2018, total 5 pages.
H.264,"Advanced video coding for generic audiovisual services",Feb. 2014,total 790 pages.
Wei Dai et al,"A Robust Interpolation-Free Approach for Sub-Pixel Accuracymotion Estimation", 2013 IEEE International Conference on Image Processing, Feb. 13, 2014, total 5 pages.
Xu Chen et al,"Decoder-Side Motion Vector Refinement Based on Bilateral Template Matching", Joint Video Exploration Team (JVET) of ITU-T SG 16 WP 3 and ISO/IEC JTC 1/SC 29/WG 11, 4th Meeting: Chengdu, CN, Oct. 15-21, 2016, Document: JVET-D0029, total 4 pages.
Qi Zhang et al,"Direct Techniques for Optimal Sub-Pixel Motion Accuracy Estimation and Position Prediction", IEEE Transactions on Circuits and Systems for Video Technology, vol. 20, No. 12, Dec. 2010, total 10 pages.
Document: JVET-J0032-v2, Feng Wu et al, Description of SDR video coding technology proposal by University of Science and Technology of China, Peking University, Harbin Institute of Technology, and Wuhan University (IEEE 1857.10 Study group), Joint Video Experts Team (JVET) of ITU-T SG 16 WP 3 and ISO/IEC JTC 1/SC 29/WG 11, 10th Meeting: San Diego, US, Apr. 10-20, 2018, total 48 pages.

* cited by examiner

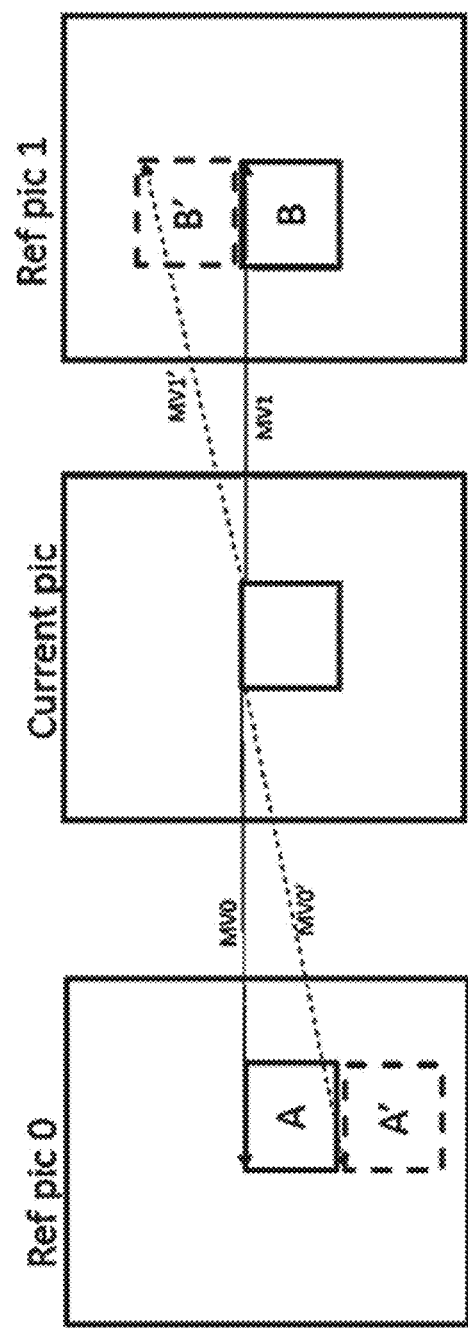
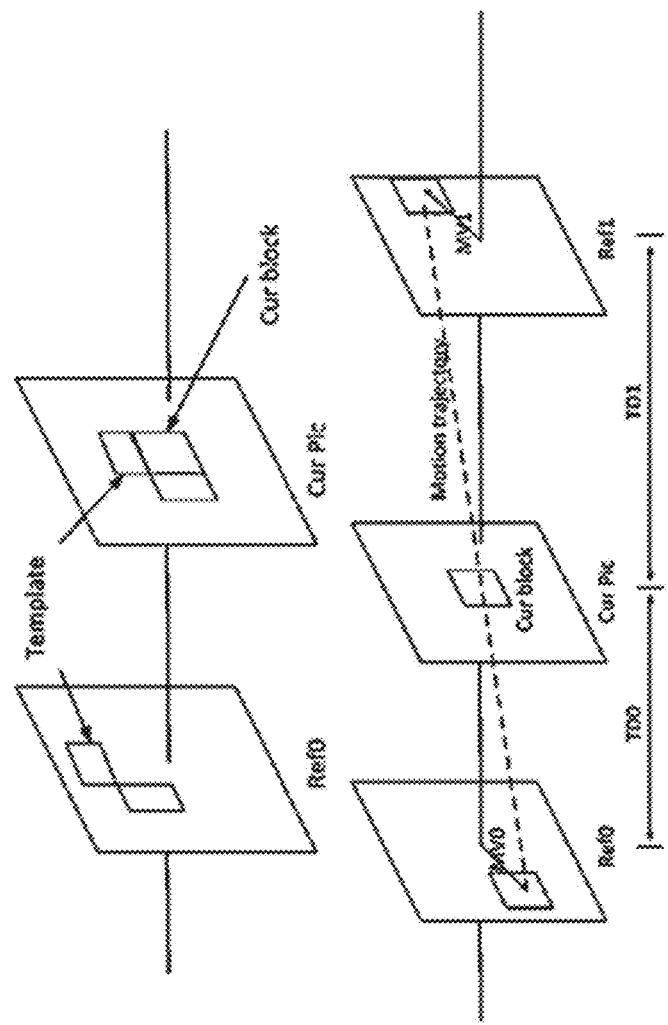
FIG. 3
FIG. 4A
FIG. 4B

FIG. 8

ERROR SURFACE BASED SUB-PIXEL ACCURATE REFINEMENT METHOD FOR DECODER SIDE MOTION VECTOR REFINEMENT

CROSS-REFERENCES TO RELATED APPLICATIONS

This application is a continuation of International Application No. PCT/CN2019/092114, filed on Jun. 20, 2019, which claims the benefit of Indian Provisional Patent Application No. IN201831024666, filed on Jul. 2, 2018, The disclosures of the aforementioned patent applications are hereby incorporated by reference in their entireties.

BACKGROUND

Current hybrid video codecs, such as H.264/AVC or H.265/HEVC, employ compression including predictive coding. A picture of a video sequence is subdivided into blocks of pixels and these blocks are then coded. Instead of coding a block pixel by pixel, the entire block is predicted using already encoded pixels in the spatial or temporal proximity of the block. The encoder further processes only the differences between the block and its prediction. The further processing typically includes a transformation of the block pixels into coefficients in a transformation domain. The coefficients may then be further compressed by means of quantization and further compacted by entropy coding to form a bitstream. The bitstream further includes any signaling information which enables the decoding of the encoded video. For instance, the signaling information may include settings concerning the encoding such as the size of the input picture, frame rate, quantization step indication, prediction applied to the blocks of the pictures, or the like. The coded signaling information and the coded signal are ordered within the bitstream in a manner known to both the encoder and the decoder. This enables the decoder to parse the coded signaling information and the coded signal.

Temporal prediction exploits the temporal correlation between pictures, also referred to as frames, of a video. The temporal prediction is also called inter-prediction, as it is a prediction using the dependencies between (inter) different video frames. Accordingly, a block being encoded, also referred to as a current block, is predicted from one or more previously encoded picture(s) referred to as a reference picture(s). A reference picture is not necessarily a picture preceding the current picture in which the current block is located in the displaying order of the video sequence. The encoder may encode the pictures in a coding order different from the displaying order. As a prediction of the current block, a co-located block in a reference picture may be determined. The co-located block is a block that is located in the reference picture in the same position as is the current block in the current picture. Such prediction is accurate for motionless picture regions, i.e., picture regions without movement from one picture to another.

In order to obtain a predictor which takes into account the movement, i.e., a motion compensated predictor, motion estimation is typically employed when determining the prediction of the current block. Accordingly, the current block is predicted by a block in the reference picture, which is located at a distance given by a motion vector from the position of the co-located block. In order to enable a decoder to determine the same prediction of the current block, the motion vector may be signaled in the bitstream. In order to further reduce the signaling overhead caused by signaling the motion vector for each of the blocks, the motion vector itself may be estimated. The motion vector estimation may be performed based on the motion vectors of the neighboring blocks in the spatial and/or temporal domain.

The prediction of the current block may be computed using one reference picture or by weighting predictions obtained from two or more reference pictures. The reference picture may be an adjacent picture, i.e., a picture immediately preceding and/or the picture immediately following the current picture in the display order since adjacent pictures are most likely to be similar to the current picture. However, in general, the reference picture may be also any other picture preceding or following the current picture in the displaying order and preceding the current picture in the bitstream (decoding order). This may provide advantages for instance in case of occlusions and/or non-linear movement in the video content. The reference picture identification may thus be also signaled in the bitstream.

A special mode of the inter-prediction is a so-called bi-prediction in which two reference pictures are used in generating the prediction of the current block. In particular, two predictions determined in the respective two reference pictures are combined into a prediction signal of the current block. The bi-prediction may result in a more accurate prediction of the current block than the uni-prediction, i.e., prediction only using a single reference picture. The more accurate prediction leads to smaller differences between the pixels of the current block and the prediction (referred to also as "residuals"), which may be encoded more efficiently, i.e., compressed to a shorter bitstream. In general, more than two reference pictures may be used to find respective more than two reference blocks to predict the current block, i.e., a multi-reference inter prediction can be applied. The term multi-reference prediction thus includes bi-prediction as well as predictions using more than two reference pictures.

In order to provide more accurate motion estimation, the resolution of the reference picture may be enhanced by interpolating samples between pixels. Fractional pixel interpolation can be performed by weighted averaging of the closest pixels. In case of half-pixel resolution, for instance a bilinear interpolation is typically used. Other fractional pixels are calculated as an average of the closest pixels weighted by the inverse of the distance between the respective closest pixels to the pixel being predicted.

The motion vector estimation is a computationally complex task in which a similarity is calculated between the current block and the corresponding prediction blocks pointed to by candidate motion vectors in the reference picture. Typically, the search region includes M×M samples of the image and each of the sample position of the M×M candidate positions is tested. The test includes calculation of a similarity measure between the N×N reference block C and a block R, located at the tested candidate position of the search region. For its simplicity, the sum of absolute differences (SAD) is a measure frequently used for this purpose and given by:

$$SAD(x, y) = \sum_{i=0}^{N-1} \sum_{j=0}^{N-1} |R_{i,j}(x, y) - C_{i,j}|$$

In the above formula, x and y define the candidate position within the search region, while indices i and j denote samples within the reference block C and candidate block R. The candidate position is often referred to as block displacement or offset, which reflects the representation of the block matching as shifting of the reference block within the search region and calculating a similarity between the reference block C and the overlapped portion of the search region. In order to reduce the complexity, the number of candidate motion vectors is usually reduced by limiting the candidate motion vectors to a certain search space. The search space may be, for instance, defined by a number and/or positions of pixels surrounding the position in the reference picture corresponding to the position of the current block in the current image. After calculating SAD for all M×M candidate positions x and y, the best matching block R is the block on the position resulting in the lowest SAD, corresponding to the largest similarity with reference block C. On the other hand, the candidate motion vectors may be defined by a list of candidate motion vectors formed by motion vectors of neighboring blocks.

Motion vectors are usually at least partially determined at the encoder side and signaled to the decoder within the coded bitstream. However, the motion vectors may also be derived at the decoder. In such a case, the current block is not available at the decoder and cannot be used for calculating the similarity to the blocks to which the candidate motion vectors point in the reference picture. Therefore, instead of the current block, a template is used which is constructed out of pixels of already decoded blocks. For instance, already decoded pixels adjacent to the current block may be used. Such motion estimation provides an advantage of reducing the signaling: the motion vector is derived in the same way at both the encoder and the decoder and thus, no signaling is needed. On the other hand, the accuracy of such motion estimation may be lower.

In order to provide a tradeoff between the accuracy and signaling overhead, the motion vector estimation may be divided into two steps: motion vector derivation and motion vector refinement. For instance, a motion vector derivation may include selection of a motion vector from the list of candidates. Such a selected motion vector may be further refined for instance by a search within a search space. The search in the search space is based on calculating the cost function for each candidate motion vector, i.e., for each candidate position of block to which the candidate motion vector points.

Document JVET-D0029: Decoder-Side Motion Vector Refinement Based on Bilateral Template Matching, X. Chen, J. An, J. Zheng (the document can be found at: http://phenix.it-sudparis.eu/jvet/site) shows motion vector refinement in which a first motion vector in integer pixel resolution is found and further refined by a search with a half-pixel resolution in a search space around the first motion vector. Bi-directional motion vector search based on a block template is employed.

Motion vector estimation is a key feature of modern video coders and decoders since its efficiency in terms of quality, rate and complexity has an impact on the efficiency of the video coding and decoding.

BRIEF SUMMARY

The present disclosure relates to encoding and decoding of video and in particular to the determination of motion vectors.

In a first aspect of the present application, a method for obtaining sub-pixel accurate delta motion vector in one or more reference frames around their respective initial sub-pixel accurate refinement center(s) in a decoder-side motion vector refinement system may include the following steps:

Performing iteratively a plurality of integer 1-pixel distance refinement operations (iterations) using a cost function to determine an integer distance refinement motion vector for each reference frame, wherein the search center is updated after an operation (iteration) to a position with the lowest cost in that operation (iteration), determining that an early exit out of the iterating loop occurs due to a center position's cost in a given operation (iteration) being lower than the costs of a set of 1-pixel neighbors around it, or determining that a predetermined number of operations (iterations) is reached. In the event that the early exit occurs, the method may include determining sub-pixel distance refinement motion vectors around the last search centers in each reference by computing the position with a minimum value on a parametric error surface fitted using the cost function values of the last search centers and the set of 1-pixel neighbors around it, and returning the total refinement motion vector as the sum of the determined integer distance refinement motion vector and the determined sub-pixel distance refinement motion vector for each reference frame. In the event that the predetermined number of operations (iterations) is reached, the method may include returning the refinement motion vectors corresponding to the position with the least cost function value across all the operations (iterations).

In an implementation of the first aspect, the cost function is performed for the joint refinement in both the reference lists L0 and L1, in such a way that the displacements in reference list L1 are equal to and opposite to the displacements in reference list L0 in both the horizontal and vertical directions (the cost function is referred to as SBM_JOINT).

In a second aspect of the present application, a method for obtaining sub-pixel accurate delta motion vector in one or more reference frames around their respective initial sub-pixel accurate refinement center(s) in a decoder-side motion vector refinement system may include the following steps:

Performing iteratively a plurality of integer 1-pixel distance refinement operations (iterations) using a first cost function to determine an integer distance refinement motion vector for each reference frame, wherein the search center is updated after an operation (iteration) to the position with the lowest cost in that operation (iteration), determining that an early exit out of the iterating loop occurs due to the center position's cost in a given operation (iteration) being lower than the costs of a set of 1-pixel neighbors around it, or determining that a predetermined number of operations (iterations) is reached;

Evaluating the cost function values at the last search center and the set of 1-pixel neighbors of the last search center using a second cost function: if the last search center position has the lowest second cost function value when compared to the second cost function values at the set of 1-pixel neighbors to the last search center, determining sub-pixel distance refinement motion vectors around the best integer distance refinement position in each reference by computing the position with a minimum value on a parametric error surface fitted using the second cost function values, and returning the total refinement motion vector as the sum of the determined integer distance refinement motion vector and the determined sub-pixel distance refinement motion vector for each reference frame. If the last search center position does not have the lowest second cost function value when compared to the second cost function values at the set of 1-pixel neighbors to the last search center else, the method includes returning the refinement motion vector corresponding to the position with the best second cost function value for each reference frame.

In an implementation of the second aspect, the first cost function is SBM_JOINT and the second cost function is TBM_INDEPENDENT, which is defined as a cost function associated with performing independent refinements in both the references lists L0 and L1 against a common bilateral averaged template.

The method can be used for template matching use-case and bilateral matching use-case.

In another aspect of the disclosure, the methods disclosed herein may be implemented as instructions that are stored in a non-transitory computer-readable medium, which may be read and executed by a processor to perform the steps of the described methods.

In some aspects of the disclosure, a method for a decoder-side motion vector refinement includes determining a target integer motion vector displacement by comparing integer distance costs corresponding to candidate integer motion vector displacements with respect to an initial motion vector, determining a sub-pixel motion vector displacement by performing calculation on the integer distance costs, and determining a refined motion vector based on the target integer motion vector displacement, the sub-pixel motion vector displacement and the initial motion vector.

Numerous benefits are achieved by way of the present disclosure over conventional techniques. For example, embodiments utilize the determined early exit from the iteration loop based on a check of the center position's cost in a given iterative operation against the costs of a set of 1-pixel neighbors around the center position. By exiting the iteration loop early, unnecessary computations can be reduced or eliminated.

Moreover, apparatuses can implement the methods described above may be a combination of a software and hardware. For example, the encoding and/or decoding may be performed by an integrated circuit (semiconductor device or chip) such as a general purpose processor (CPU), a digital signal processor (DSP), an application specific integrated circuit (ASIC), or a field programmable gate array (FPGA), or the like. However, embodiments of the present invention are not limited to implementation on a programmable hardware. Embodiments of the present invention may be implemented on an application-specific integrated circuit or by a combination of one or more of a CPU, DSP, FPGA, and ASIC components.

BRIEF DESCRIPTION OF THE DRAWINGS

In the following, exemplary embodiments are described in more detail with reference to the attached figures and drawings, in which:

FIG. 3 is a schematic drawing illustrating an exemplary template matching suitable for bi-prediction;

FIG. 4A is a schematic drawing illustrating an exemplary template matching suitable for uni-prediction and bi-prediction;

FIG. 4B is a schematic drawing illustrating an exemplary bilateral matching suitable for uni-prediction and bi-prediction;

FIG. 8 is a schematic drawing illustrating an example of sub-pixel position;

DETAILED DESCRIPTION

Embodiments of the present disclosure relate to improvements of template matching applied in motion vector refinement. In particular, the template matching is applied to zero-mean template and zero-mean candidate block even if the mean of the found best matching blocks is not further adjusted (by local illumination control).

The template matching is used to find the best first and second motion vectors which point to a first reference picture and a second reference picture, respectively. The template matching is performed for each reference picture by template matching in a predetermined search space on a location given by an initial motion vector which may be derived by the decoder or signaled to the decoder.

The template matching may be performed based on a block template derived from the blocks pointed to by the initial motion vectors.

Such template matching for finding the best matching blocks to obtain predictor for the current block may be employed, for instance, in hybrid video encoder and/or decoder. For example, application to an encoder and/or decoder such as HEVC or similar may be advantageous. In particular further developments of HEVC or new codecs/standards may make use of embodiments of the present disclosure.

Figure 1:
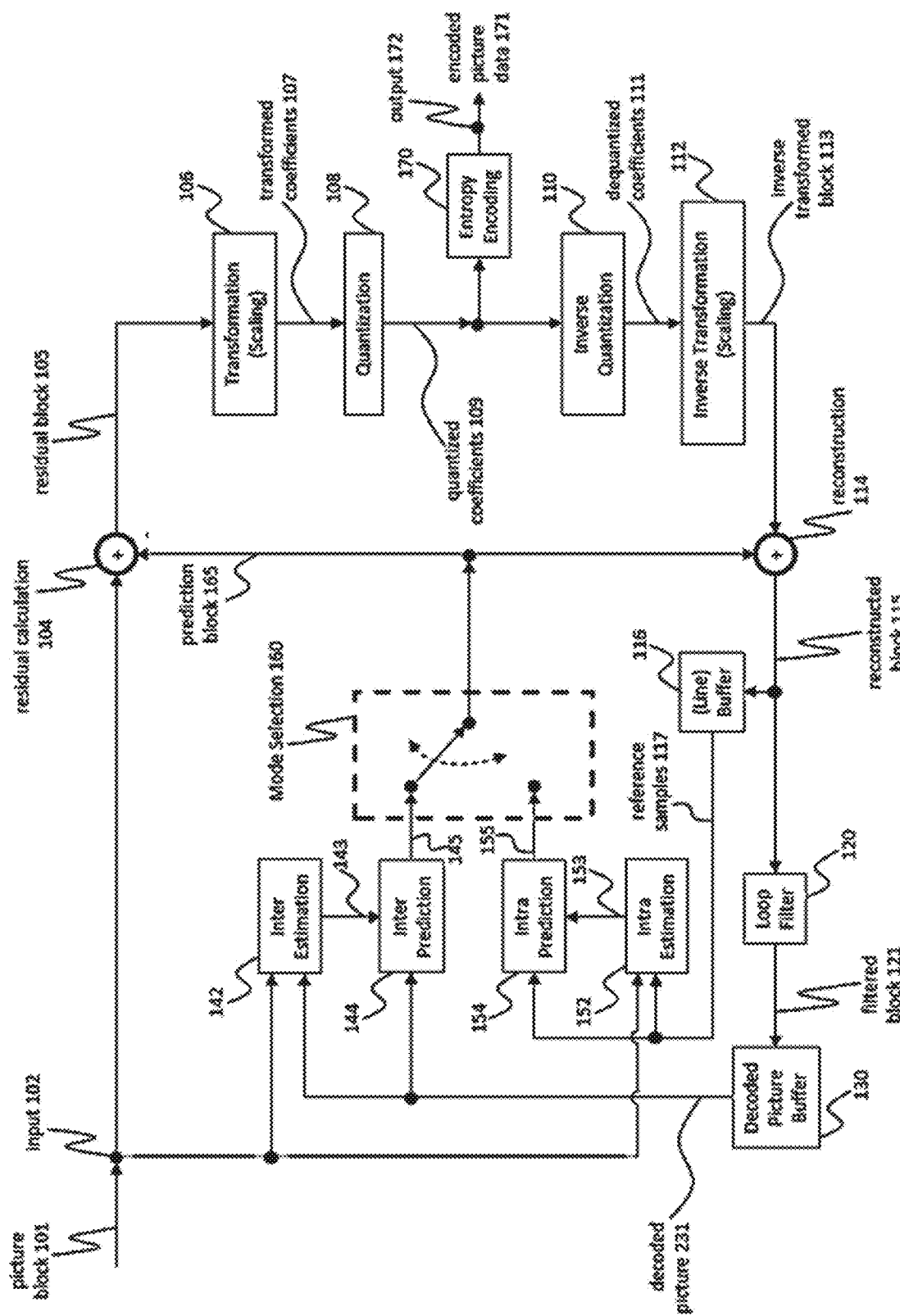
FIG. 1 is a block diagram showing an exemplary structure of an encoder for encoding video signals according to an embodiment of the present disclosure.

FIG. 1 shows an encoder 100 which includes an input 102 for receiving input image samples of frames or pictures of a video stream and an output 172 for generating an encoded video bitstream. As used herein, the term "frame" in this disclosure is also referred to as a picture. It is noted that the present disclosure is also applicable to interlacing fields of video. In general, a picture includes m×n pixels, which corresponds to image samples and may include one or more color components. As used herein, the following description refers to pixels as luminance samples. However, it is noted that the motion vector search of the present disclosure can be applied to any color component including chrominance or components of a search space such as RGB or the like. Moreover, it may be advantageous to only perform motion vector estimation for one component and apply the estimated motion vector to more or all components.

The input blocks to be coded do not necessarily have the same size. One picture may include blocks of different sizes and the block raster of different pictures may also differ.

In an exemplary embodiment, the encoder 100 is configured to perform prediction, transformation, quantization, and entropy coding to the video stream. The transformation, quantization, and entropy coding are carried out respectively by a transform unit 106, a quantization unit 108 and an entropy encoding unit 170 to generate an encoded video bitstream.

The video stream may include a plurality of frames, where each frame is divided into blocks of a certain size that are either intra or inter coded. For example, blocks of a first frame of the video stream are intra coded by means of an intra prediction unit 154. An intra frame is coded using only information within the same frame, so that it can be independently decoded and it can provide an entry point in the bitstream for random access. Blocks of other frames of the video stream may be inter coded by means of an inter prediction unit 144, i.e., information from previously coded frames (reference frames) is used to reduce the temporal redundancy, so that each block of an inter-coded frame is predicted from a block in a reference frame. A mode selection unit 160 is configured to select between a block 155 of a frame that is processed by the intra prediction unit 154 or a block 145 of a frame that is processed by the inter prediction unit 144. The mode selection unit 160 also controls the parameters of intra or inter prediction. In order to enable refreshing of image information, intra-coded blocks may be provided within inter-coded frames. Moreover, intra-frames which contain only intra-coded blocks may be regularly inserted into the video sequence in order to provide entry points for decoding, i.e., points where the decoder can start decoding without having information from the previously coded frames.

The intra estimation unit 152 and the intra prediction unit 154 are units configured to perform the intra prediction. In particular, the intra estimation unit 152 may derive the prediction mode based also on the knowledge of the original image while intra prediction unit 154 provides the corresponding predictor, i.e., samples predicted using the selected prediction mode, for the difference coding. For performing spatial or temporal prediction, the coded blocks may be further processed by an inverse quantization unit 110, and an inverse transformation unit 112 to provide an inverse transformed block 113. A reconstruction unit 114 combines the inverse transformed block 113 with the prediction block 165 to provide a reconstructed block 115, which is provided to a loop filtering unit 120 to further improve the quality of the decoded image. The filtered blocks then form the reference frames that are then stored in a decoded picture buffer 130. The inverse quantization unit 110, the inverse transformation unit 112, the reconstruction unit 114 and the loop filter 120 form a part of a decoder (decoding loop). Such decoding loop (decoder) at the encoder side provides the advantage of producing reference frames which are the same as the reference pictures reconstructed at the decoder side. Accordingly, the encoder and the decoder operate in a corresponding manner. The term "reconstruction" herein refers to obtaining the reconstructed block 115 by adding the prediction block 165 to the inversed transformed (decoded residual) block 113.

The encoder 100 also includes an inter estimation unit 142, which receives a picture block 101 of a current frame or picture to be inter coded and one or several reference frames from the decoded picture buffer 130. Motion estimation is performed by the inter estimation unit 142 whereas motion compensation is performed by the inter prediction unit 144. The motion estimation is used to obtain a motion vector and a reference frame based on certain cost function, for instance using also the original image to be coded. For example, the motion estimation (inter estimation) unit 142 may provide initial motion vector estimation. The initial motion vector may then be signaled (transmitted as a signal) within the bitstream in form of a motion vector directly or as an index referring to a motion vector candidate within a list of candidates constructed based on a predetermined rule in the same way at the encoder and the decoder. The motion compensation then derives a predictor of the current block as a translation of a block co-located with the current block in the reference frame to the reference block in the reference frame, i.e., by a motion vector. The inter prediction unit 144 outputs the prediction block 145 for the current block, where the prediction block 145 minimizes the cost function. For instance, the cost function may be a difference between the current block to be coded and its prediction block, i.e., the cost function minimizes the residual block 105. The minimization of the residual block is based, e.g., on calculating a sum of absolute differences (SAD) between all pixels (samples) of the current block and the candidate block in the candidate reference picture. In general, any other similarity metric may be employed, such as mean square error (MSE) or structural similarity metric (SSIM).

A cost function may also be the number of bits necessary to code such inter-block and/or distortion resulting from such coding. Thus, the rate-distortion optimization procedure may be used to decide on the motion vector selection and/or in general on the encoding parameters such as whether to use inter or intra prediction for a block and with which settings.

The intra estimation unit 152 and inter prediction unit 154 receive as an input a picture block 101 of a current frame or picture to be intra coded and one or several reference samples 117 from an already reconstructed area of the current frame. The intra prediction then describes pixels of a current block of the current frame in terms of a function of reference samples of the current frame. The intra prediction unit 154 outputs a prediction block for the current block, where the prediction block advantageously minimizes the difference between the current block to be coded and its prediction block, i.e., it minimizes the residual block. The minimization of the residual block can be based, e.g., on a rate-distortion optimization procedure. In particular, the prediction block is obtained as a directional interpolation of the reference samples. The direction may be determined by the rate-distortion optimization and/or by calculating a similarity measure as described above in connection with inter-prediction.

The inter estimation unit 142 receives as an input a block or a more universal-formed image sample of a current frame or picture to be inter coded and two or more already decoded pictures 231. The inter prediction then describes a current image sample of the current frame in terms of motion vectors to reference image samples of the reference pictures. The inter prediction unit 144 outputs one or more motion vectors 145 for the current image sample, where the reference image samples pointed to by the motion vectors advantageously minimize the difference between the current image sample to be coded and its reference image samples, i.e., it minimizes the residual image sample. The predictor for the current block is then provided by the inter prediction unit 144 for the difference coding.

The difference between the current block and its prediction, i.e., the residual block 105, is then transformed by the transformation unit 106 to generate transformed coefficients 107. The transformed coefficients 107 are quantized by the quantization unit 108 and entropy coded by the entropy encoding unit 170. The thus generated encoded picture data 171, i.e., encoded video bitstream, comprises intra coded blocks and inter coded blocks and the corresponding signaling information (such as the mode indication, indication of the motion vector, and/or intra-prediction direction). The transformation unit 106 may apply a linear transformation such as a Discrete Fourier Transformation, Fast Fourier Transformation or Discrete Cosine Transformation (DFT/ FFT or DCT). The transformation into the spatial frequency domain provides the advantage that the resulting coefficients 107 have typically higher values in the lower frequencies. Thus, after an effective coefficient scanning (such as zig-zag scanning), and quantization, the resulting sequence of values has typically some larger values at the beginning and has a sequence of zeros at the end. This enables further efficient coding. Quantization unit 108 performs the actual lossy compression by reducing the resolution of the coefficient values. The entropy coding unit 170 then assigns to coefficient values binary codewords to produce a bitstream. The entropy coding unit 170 also codes the signaling information (not shown in FIG. 1).

Figure 2:
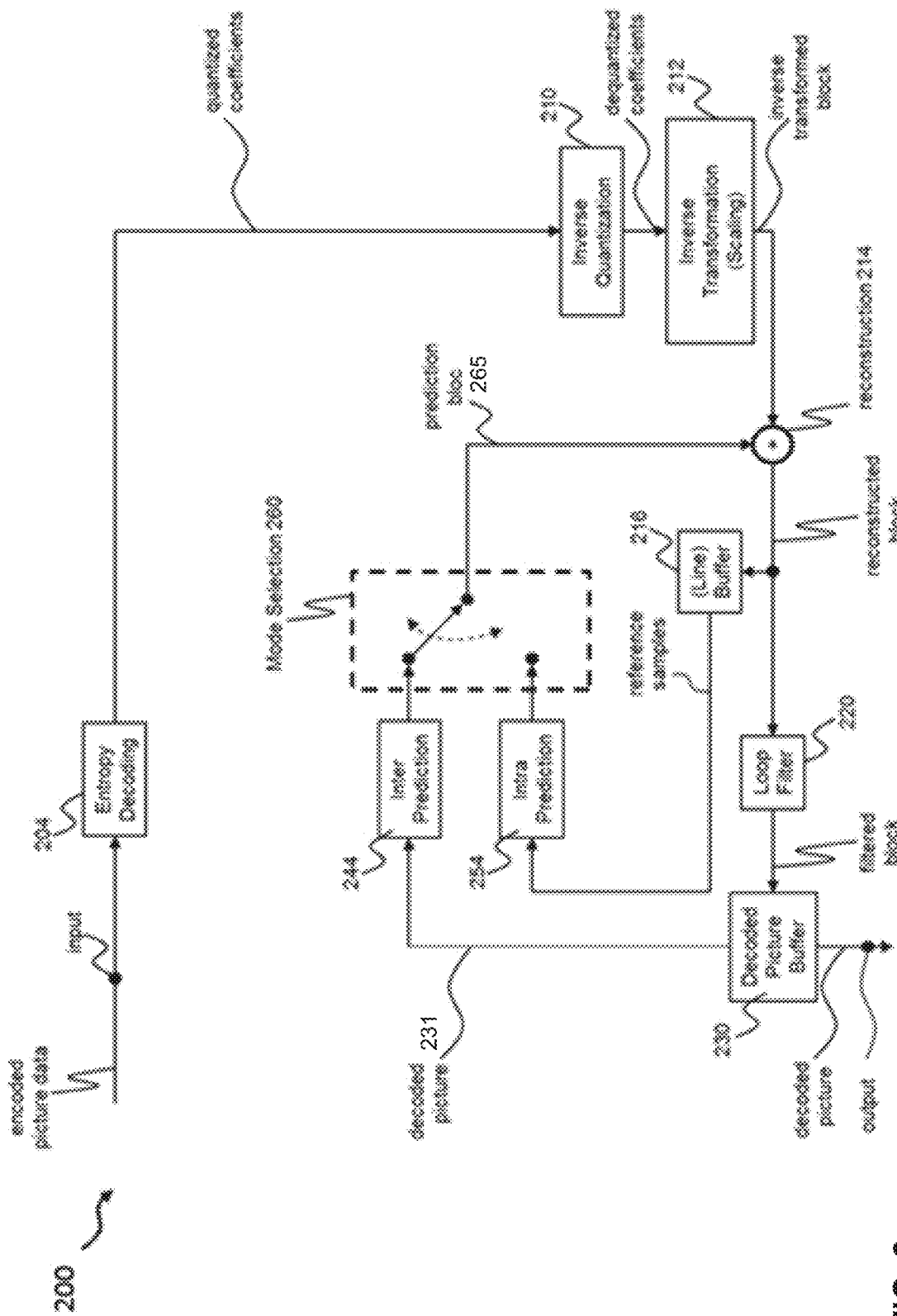
FIG. 2 is a block diagram showing an exemplary structure of a decoder for decoding video signal according to an embodiment of the present disclosure s.

FIG. 2 shows a video decoder 200. The video decoder 200 includes a decoded picture buffer 230, an inter prediction unit 244 and an intra prediction unit 254, which is a block prediction unit. The decoded picture buffer 230 is configured to store at least one (for uni-prediction) or at least two (for bi-prediction) reference frames reconstructed from the encoded video bitstream, the reference frames are different from a current frame (currently decoded frame) of the encoded video bitstream. The intra prediction unit 254 is configured to generate a prediction block, which is an estimate of the block to be decoded. The intra prediction unit 254 is configured to generate this prediction based on reference samples that are obtained from the decoded picture buffer 230.

The decoder 200 is configured to decode the encoded video bitstream generated by the video encoder 100, and preferably both the decoder 200 and the encoder 100 generate identical predictions for the respective block to be encoded/decoded. The features of the decoded picture buffer 230 and the intra prediction unit 254 are similar to the features of the decoded picture buffer 130 and the intra prediction unit 154 of FIG. 1.

The video decoder 200 further includes units that are also present in the video encoder 100 like, e.g., an inverse quantization unit 210, an inverse transformation unit 212, and a loop filtering unit 220, which respectively correspond to the inverse quantization unit 110, the inverse transformation unit 112, and the loop filtering unit 120 of the video coder 100.

An entropy decoding unit 204 is configured to decode the received encoded video bitstream and to correspondingly obtain quantized residual transform coefficients 209 and signaling information. The quantized residual transform coefficients 209 are provided to the inverse quantization unit 210 and the inverse transform unit 212 to generate a residual (inversed transformed) block. The residual block is added to a prediction block 265 at the reconstructed unit 214 and the addition is provided to the loop filtering unit 220 to obtain the decoded video. Frames of the decoded video can be stored in the decoded picture buffer 230 and serve as a decoded picture 231 for inter prediction.

Generally, the intra prediction units 154 and 254 of FIGS. 1 and 2 can use reference samples from an already encoded area to generate prediction signals for blocks that need to be encoded or need to be decoded.

The entropy decoding unit 204 receives as its input the encoded bitstream 171. In general, the bitstream is first parsed, i.e., the signaling parameters and the residuals are extracted from the bitstream. Typically, the syntax and semantic of the bitstream is defined by a standard so that the encoders and decoders may work in an interoperable manner. As described in the above Background section, the encoded bitstream does not only include the prediction residuals. In case of motion compensated prediction, a motion vector indication is also coded in the bitstream and parsed therefrom at the decoder. The motion vector indication may be given by means of a reference picture in which the motion vector is provided and by means of the motion vector coordinates. So far, coding the complete motion vectors has been considered. However, also only the difference between the current motion vector and the previous motion vector in the bitstream may be encoded. This approach allows the exploitation of the redundancy between motion vectors of neighboring blocks.

In order to efficiently code the reference picture, H.265 codec (ITU-T, H265, Series H: Audiovisual and multimedia systems: High Efficient Video Coding) provides a list of reference pictures assigning to list indices respective reference frames. The reference frame is then signaled in the bitstream by including therein the corresponding assigned list index. Such list may be defined in the standard or signaled at the beginning of the video or a set of a number of frames. It is noted that in H.265 there are two lists of reference pictures defined, referred to as reference lists L0 and L1. The reference picture is then signaled in the bitstream by indicating the reference list (L0 or L1) and indicating an index in that list associated with the desired reference picture. Providing two or more lists may have advantages for better compression. For instance, the reference list L0 may be used for both uni-directionally inter-predicted slices and bi-directionally inter-predicted slices while the reference list L1 may only be used for bi-directionally inter-predicted slices. However, in general the present disclosure is not limited to any content of the lists L0 and L1.

The reference lists L0 and L1 may be defined in the standard and fixed. However, more flexibility in coding/decoding may be achieved by signaling them at the beginning of the video sequence. Accordingly, the encoder may configure the lists L0 and L1 with particular reference pictures ordered according to the index. The reference lists L0 and L1 may have the same fixed size. In general, there may be more than two lists. The motion vector may be signaled directly by the coordinates in the reference picture. Alternatively, as also specified in H.265, a list of candidate motion vectors may be constructed and an index associated in the list with the particular motion vector can be transmitted.

Motion vectors of the current block are usually correlated with the motion vectors of neighboring blocks in the current picture or in the earlier coded pictures. This is because neighboring blocks are likely to correspond to the same moving object with similar motion and the motion of the object is not likely to change abruptly over time. Consequently, using the motion vectors in neighboring blocks as predictors reduces the size of the signaled motion vector difference. The Motion Vector Predictors (MVPs) are usually derived from already encoded/decoded motion vectors from spatial neighboring blocks or from temporally neighboring blocks in the co-located picture. In H.264/AVC, this is done by performing a component wise median of three spatially neighboring motion vectors. Using this approach, no signaling of the predictor is required. Temporal MVPs from a co-located picture are only considered in the so called temporal direct mode of H.264/AVC. The H.264/AVC direct modes are also used to derive other motion data than the motion vectors. Hence, they relate more to the block merging concept in HEVC. In HEVC, the approach of implicitly deriving the MVP was replaced by a technique known as motion vector competition, which explicitly signals which MVP from a list of MVPs is used for motion vector derivation. The variable coding quad-tree block structure in HEVC can result in one block having several neighboring blocks with motion vectors as potential MVP candidates. Taking the left neighbor as an example, in the worst case a 64×64 luma prediction block could have 16 4×4 luma prediction blocks to the left when a 64×64 luma coding tree block is not further split and the left one is split to the maximum depth.

Advanced Motion Vector Prediction (AMVP) was introduced to modify motion vector competition to account for such a flexible block structure. During the development of HEVC, the initial AMVP design was significantly simplified to provide a good trade-off between coding efficiency and an implementation friendly design. The initial design of AMVP included five MVPs from three different classes of predictors: three motion vectors from spatial neighbors, the median of the three spatial predictors and a scaled motion vector from a co-located, temporally neighboring block. Furthermore, the list of predictors was modified by reordering to place the most probable motion predictor in the first position and by removing redundant candidates to assure minimal signaling overhead. The final design of the AMVP candidate list construction includes the following two MVP candidates: a) up to two spatial candidate MVPs that are derived from five spatial neighboring blocks; b) one temporal candidate MVP derived from two temporal, co-located blocks when both spatial candidate MVPs are not available or they are identical; and c) zero motion vectors when the spatial, the temporal or both candidates are not available. Details on motion vector determination can be found in the book by V. Sze et al (Ed.), High Efficiency Video Coding (HEVC): Algorithms and Architectures, Springer, 2014, in particular in Chapter 5, incorporated herein by reference.

In order to further improve motion vector estimation without further increasing the signaling overhead, it may be beneficial to further refine the motion vectors derived at the encoder side and provided in the bitstream. The motion vector refinement may be performed at the decoder without assistance from the encoder. The encoder in its decoder loop may employ the same refinement to obtain corresponding motion vectors. Motion vector refinement is performed in a search space which includes integer pixel positions and fractional pixel positions of a reference picture. For example, the fractional pixel positions may be half-pixel positions, quarter-pixel positions, or other fractional positions. The fractional pixel positions may be obtained from the integer (full-pixel) positions by interpolation such as bi-linear interpolation.

In a bi-prediction of current block, two prediction blocks obtained using the respective first motion vector of reference list L0 and the second motion vector of reference list L1, are combined to a single prediction signal, which can provide a better adaptation to the original signal than uni-prediction, resulting in less residual information and possibly a more efficient compression.

At the decoder, the current block is not available since it is being decoded, for the purpose of motion vector refinement, a template is used, which is an estimate of the current block and which is constructed based on the already processed (i.e., coded at the encoder side and decoded at the decoder side) image portions.

First, an estimate of the first motion vector MV0 and an estimate of the second motion vector MV1 are received as input at the decoder 200. At the encoder 100, the motion vector estimates MV0 and MV1 may be obtained by block matching and/or by searching in a list of candidates (such as merge list) formed by motion vectors of the blocks neighboring to the current block (in the same picture or in adjacent pictures). MV0 and MV1 are then advantageously signaled to the decoder side within the bitstream. However, it is noted that in general, also the first determination stage at the encoder could be performed by template matching which would provide the advantage of reducing signaling overhead.

At the decoder 200, the motion vectors MV0 and MV1 are advantageously obtained based on information in the bitstream. The motion vectors MV0 and MV1 are either directly signaled, or differentially signaled, and/or an index in the list of motion vectors (merge list) is signaled. However, the present disclosure is not limited to signaling motion vectors in the bitstream. Rather, in accordance with the present disclosure, the motion vector may be determined by template matching already in the first stage of motion vector estimation, correspondingly to the operation of the encoder. The template matching of the first stage (motion vector derivation) may be performed based on a search space different from the search space of the second motion vector refinement stage. In particular, the motion vector refinement may be performed on a search space with higher resolution (i.e., shorter distance between the search positions).

An indication of the two reference pictures RefPic0 and RefPic1, to which respective MV0 and MV1 point, are provided to the decoder as well. The reference pictures are stored in the decoded picture buffer at the encoder and decoder as a result of previous processing, i.e., respective encoding and decoding. One of these reference pictures is selected for motion vector refinement by search. A reference picture selection unit of the apparatus for the determination of motion vectors is configured to select the first reference picture to which MV0 points and the second reference picture to which MV1 points. Following the selection, the reference picture selection unit determines whether the first reference picture or the second reference picture is used for performing motion vector refinement. For performing motion vector refinement, the search region in the first reference picture is defined around the candidate position to which motion vector MV0 points. The candidate search space positions within the search region are analyzed to find a block that is most similar to a template block by performing template matching within the search space and determining a similarity metric such as the sum of absolute differences (SAD). The positions of the search space denote the positions on which the top left corner of the template is matched. As described above, the top left corner is a mere convention and any point of the search space such as the center point can in general be used to denote the matching position.

FIG. 4A illustrates an alternative template matching which is also applicable for uni-prediction. Details can be found in Document JVET-A1001, in particular in Section 2.4.6. "Pattern matched motion vector derivation" of Document JVET-A1001 entitled "Algorithm Description of Joint Exploration Test Model 1", by Jianle Chen et. al. and accessible at: http://phenix.it-sudparis.eu/jvet/. The template in this template matching approach is determined as samples adjacent to the current bock in the current frame. As shown in FIG. 1 of Document JVET-A1001, the already reconstructed samples adjacent to the top and left boundary of the current block may be taken, referred to as "L-shaped template".

According to Document JVET-D0029, which is incorporated by reference, the decoder-side motion vector refinement (DMVR) has as an input including the initial motion vectors MV0 and MV1 which point to two respective reference pictures RefPict0 and RefPict1. These initial motion vectors are used for determining the respective search spaces in the RefPict0 and RefPict1. Moreover, using the motion vectors MV0 and MV1, a template is constructed based on the respective blocks (of samples) A and B pointed to by MV0 and MV1 as follows:
Template=function (Block A, Block B).

The function may be a sample clipping operation in combination with sample-wise weighted summation. The template is then used to perform template matching in the search spaces determined based on MV0 and MV1 in the respective reference pictures Refpic0 and Refpic1. The cost function for determining the best template match in the respective search spaces is SAD (Template, Block candA'), where Block candA' is the candidate coding block which is pointed by the candidate MV in the search space spanned on a position given by the MV0. FIG. 3 illustrates the determination of the best matching block A' and the resulting refined motion vector MV0'. Correspondingly, the same template is used to find the best matching block B' and the corresponding motion vector MV1' which points to block B' as shown in FIG. 3. In other words, after the template is constructed based on the block A and B pointed to by the initial motion vectors MV0 and MV1, the refined motion vectors MV0' and MV1' are found via a search on RefPic0 and RefPic1 with the template.

Motion vector derivation techniques are sometimes also referred to as frame rate up-conversion (FRUC). The initial motion vectors MV0 and MV1 may generally be indicated in the bitstream to ensure that the encoder and decoder may use the same initial point for motion vector refinement. Alternatively, the initial motion vectors may be obtained by providing a list of initial candidates including one or more initial candidates. For each of them, a refined motion vector is determined and at the end, the refined motion vector having the lowest cost function is selected.

As described above, template-matched motion vector derivation mode is a special merge mode based on the FRUC techniques. With this mode, motion information of the block is derived at the decoder side. According to the implementation that is described in Document JVET-A1001 ("Algorithm Description of Joint Exploration Test Model 1", which is accessible at http://phenix.it-sudparis.eu/jvet/), FRUC flag is signaled for a CU or PU when the merge flag is true. When the FRUC flag is false, a merge index is signaled and the regular merge mode is used. When the FRUC flag is true, an additional FRUC mode flag is signaled to indicate which method (bilateral matching or template matching) is to be used to derive motion information for the block.

In summary, during the motion vector derivation process, an initial motion vector is first derived for the whole Prediction Unit (PU) based on bilateral matching or template matching. First, a list of MV candidates is generated, which can be, e.g., the merge list of the PU. The list is checked and the candidate which leads to the minimum matching cost is selected as the starting point (initial motion vector). Then a local search based on bilateral matching or template matching around the starting point is performed and the Motion Vector(s) (MV) that result in the minimum matching cost is taken as the MV for the PU. Then the motion information is further refined with the derived PU motion vectors as the starting points. The terms prediction unit (PU) and coding unit (CU) can be used interchangeably herein to describe a block of samples within a picture (frame).

As shown in FIG. 4B, the bilateral matching (that is described in Document JVET-A1001) is used to derive motion information of the current CU by finding the closest match between two blocks along the motion trajectory of the current CU in two different reference pictures. Under the assumption of continuous motion trajectory, the motion vectors MV0 and MV1 pointing to the two reference blocks shall be proportional to the temporal distances, i.e., TD0 and TD1, between the current picture and the two reference pictures. Accordingly, in one embodiment of the present disclosure, in each tested candidate pair of vectors, the two respective vectors are on a straight line in the image plane. As a special case, when the current picture is temporally between the two reference pictures and the temporal distance from the current picture to the two reference pictures is the same, the bilateral matching becomes mirror based bi-directional MV.

As shown in FIG. 4A, template matching (described in Document JVET-A1001) is used to derive motion information of the current CU by finding the closest match between a template (top and/or left neighbouring blocks of the current CU) in the current picture and a block (same size to the template) in a reference picture. The "Pattern matched motion vector derivation" section of Document JVET-A1001 describes a specific implementation of the template matching and bilateral matching methods. An example discloses that the bilateral matching operation is applied only if the "merge flag" is true, indicating that the "block merging" operation mode is selected. Here the authors of Document JVET-A1001 refer to the "merge mode" of the H.265 standard. It is noted that template matching and bilateral matching methods described in JVET-A1001 can also be applied to other video coding standards, resulting in variations in the specific implementation.

Figure 5:
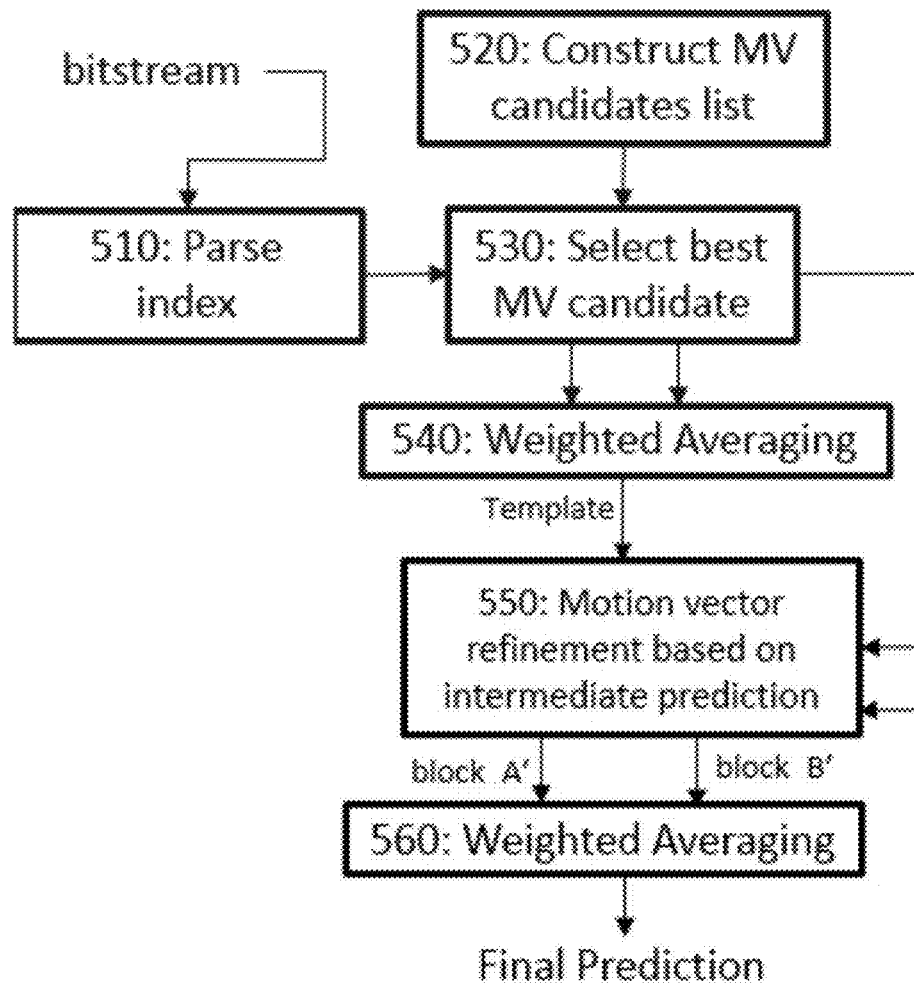
FIG. 5 is a flow diagram illustrating a possible implementation of motion vector search.

FIG. 5 is a flow diagram illustrating a decoder-side motion vector refinement (DMVR) operation. According to Document JVET-D0029, the DMVR is applied under two conditions: 1) the prediction type is set to skip mode or merge mode, 2) the prediction mode is bi-prediction. First, initial motion vectors MV0 (of reference list L0) and MV1 (of reference list L1) are derived. The derivation process is performed according to the respective skip and merge operations. Here the authors of Document JVET-D0029 refer to the skip mode and merge mode of the H.265 standard. The description of these modes can be found in Section 5.2.2.3 "Merge Motion Data Signaling and Skip Mode" of the book by v. Sze, M. Budagavi and G. J. Sullivan (Ed.), High Efficiency Video Coding (HEVC), Algorithms and Architectures, 2014. In H.265 if the skip mode is used to indicate for a block that the motion data is inferred instead of explicitly signaled and that the prediction residual is zero, i.e., no transform coefficients are transmitted. If the merge mode is selected, the motion data is also inferred, but the prediction residual is not zero, i.e., transform coefficients are explicitly signaled.

The parse index is parsed (510) from the input video stream. The parsed index points to the best motion vector candidate of an MV candidate list, which is constructed (520). The best motion vector candidate is then selected (530) and the template is obtained by weighted averaging (540). The DMVR (550) is applied as follows. A block template is calculated by adding together the blocks that are referred to by MV0 and MV1 as explained above with reference to FIG. 3. Clipping is performed afterward. The template is used to find a refined motion vector MV0' around the initial motion vector MV0. The search region is integer pel-resolution (the points of the search space are spaced from each other by integer sample distance). Sum of Absolute Differences (SAD) cost measure is used to compare the template block and the new block pointed by MV0'. The template is used to find a refined MV0", around the MV0'. The search region is half-pel resolution (the points of the search space are spaced from each other by half of the sample distance). The terms "pel" and "pixel" are interchangeably used herein. The same cost measure is used. The latter two steps are repeated to find MV1". The new bi-predicted block is formed by adding together the blocks pointed by MV0" and MV1". The blocks block_A' and block_B' pointed to by such refined motion vectors MV0" and MV1" are then averaged, e.g., weighted averaging (560) to obtain the final prediction.

Figure 6:
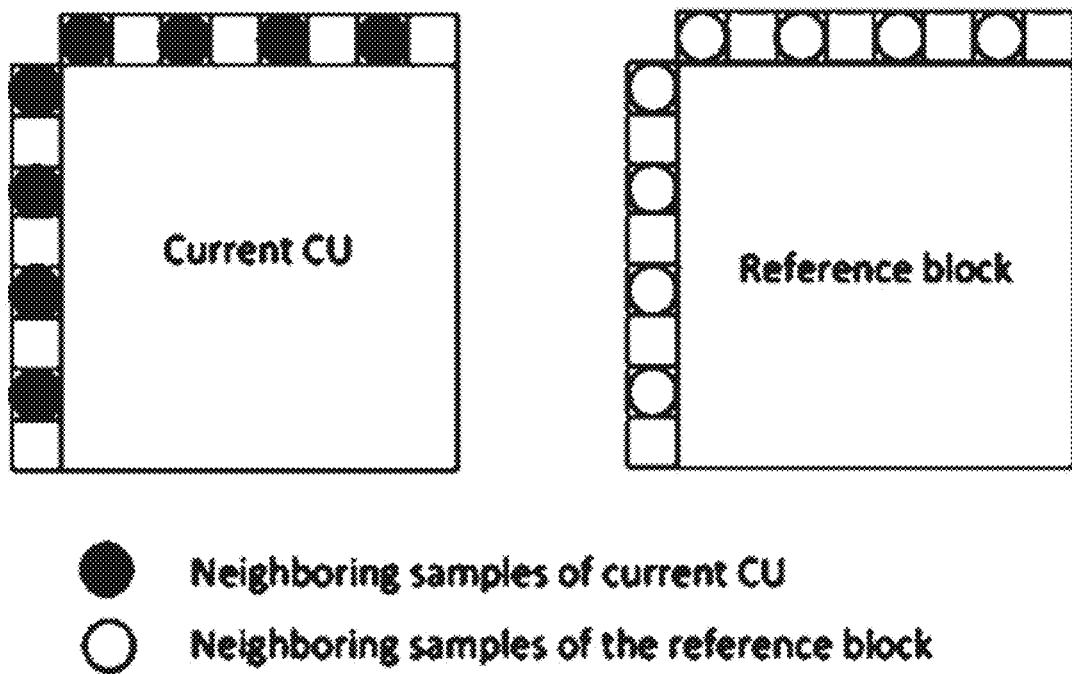
FIG. 6 is a schematic drawing illustrating an example of local illumination compensation applied in video coding.

FIG. 6 is a schematic drawing illustrating an example of local illumination compensation (LIC) that may be employed in video coding and decoding according to aspects of the present disclosure. Local Illumination Compensation (LIC) is based on a linear model for illumination changes, using a scaling factor "a" and an offset "b." LIC may be enabled or disabled adaptively for each inter-mode coded coding unit (CU). When LIC applies for a CU, a least square error method may be employed to derive the parameters a and b by using the neighboring samples of the current CU and their corresponding reference samples. More specifically, as illustrated in FIG. 6, the subsampled (2:1 subsampling) neighboring samples of the CU and the corresponding samples (identified by motion information of the current CU or sub-CU) in the reference picture are used. The LIC parameters are derived and applied for each prediction direction separately. Here, the subsampling 2:1 means that every second pixel on the current CU boundary and the reference block is taken. More details on the use of a scaling factor, multiplicative weighting factor and the offset can be found in Section "2.4.4. Local illumination compensation" of Document JVET-A1001.

Figure 7:
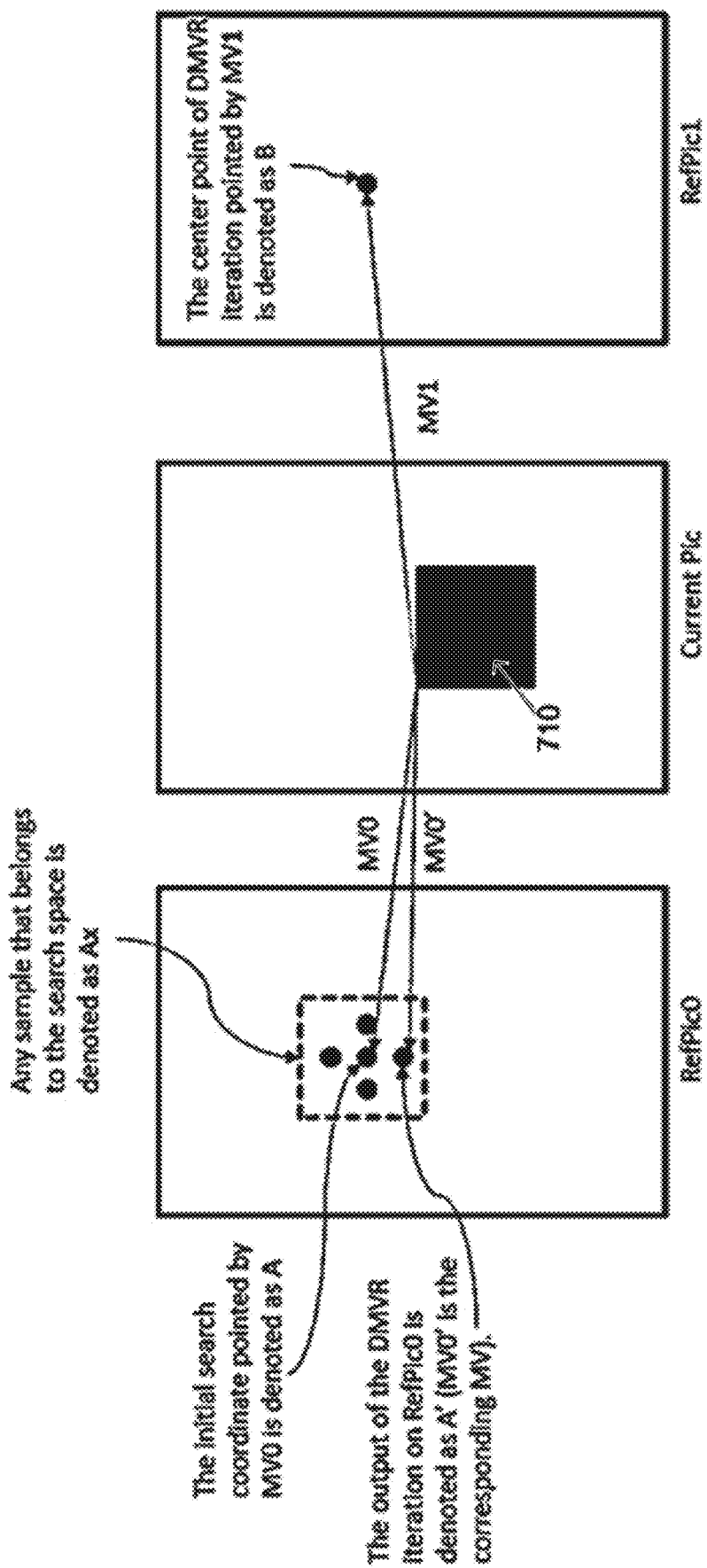
FIG. 7 is a schematic drawing illustrating an example of decoder-side motion vector refinement.

FIG. 7 is a schematic drawing illustrating a decoder-side motion vector refinement (DMVR) iteration performed on reference picture RefPic0. The current picture includes current block 710 for which motion vector MV0' should be found based on motion vector MV0 in RefPic0. Search space including 5 integer positions is determined; the blocks pointed to by the candidate position are referred to as Ax. The output is the best matching of the blocks Ax pointed to by motion vector MV0'.

Whenever an explicit merge-mode index is signaled, the decoder side motion vector refinement starts from the motion vector(s) and reference indices normatively deduced from the signaled index. When an explicit merge-mode index is not signaled, a set of initial motion vector candidates are evaluated at the decoder using a cost function and the candidate with the lowest cost is chosen as the starting point for refinement. Thus, irrespective of whether the decoder-side motion vector derivation method is based on predicted/reconstructed neighbor block boundary samples (commonly referred to as Template Matching (TM) refer FIG. 4A) or based on bilateral matching through a difference minimization between the corresponding patches in reference list L0 and reference list L1 (commonly referred to as Bilateral matching (BM) cost) or based on the difference between an averaged version of the corresponding patches in reference list L0 and reference list L1 and a displacement in L0/L1 (referred to as DMVRcost), there is a refinement search that needs to be performed around starting points that can be sub-pixel accurate motion vectors.

In order to evaluate the cost function, an interpolation needs to be performed to derive the values at the sub-pixel accurate centers based on the values of the reference frames at the integer grid positions. The interpolating filter can be as simple as a bilinear interpolation filter or can be a longer filter such as the 2-D DCT-based separable interpolation filters. In order to reduce the complexity of deriving the interpolated samples for a block again and again at each position considered during the refinement, an integer-pixel distance grid of refinement points centered at the sub-pixel accurate position(s) in L0 and/or L1 has been proposed. With this, only incremental interpolations need to be performed as a new position close to a current best cost position is considered. After the refinement of integer-pixel distance grid is completed, the best integer delta MVs are obtained with regard to the merge MVs.

In order to improve the compression gains further, sub-pixel distance refinement can be performed. A half pixel distance refinement requires the interpolated samples at half pixel distance from the best integer distance MV position(s) in the reference frame(s). It is possible to perform the sub-pixel accurate refinement jointly between L0 and L1 where the displacements in L0 with respect to the best integer distance MV position in L0 are negated to obtain the corresponding displacements in L1 with respect to the best integer distance MV position in L1. It is also possible to perform the sub-pixel accurate refinement independently in L0 and L1.

Figure 8:
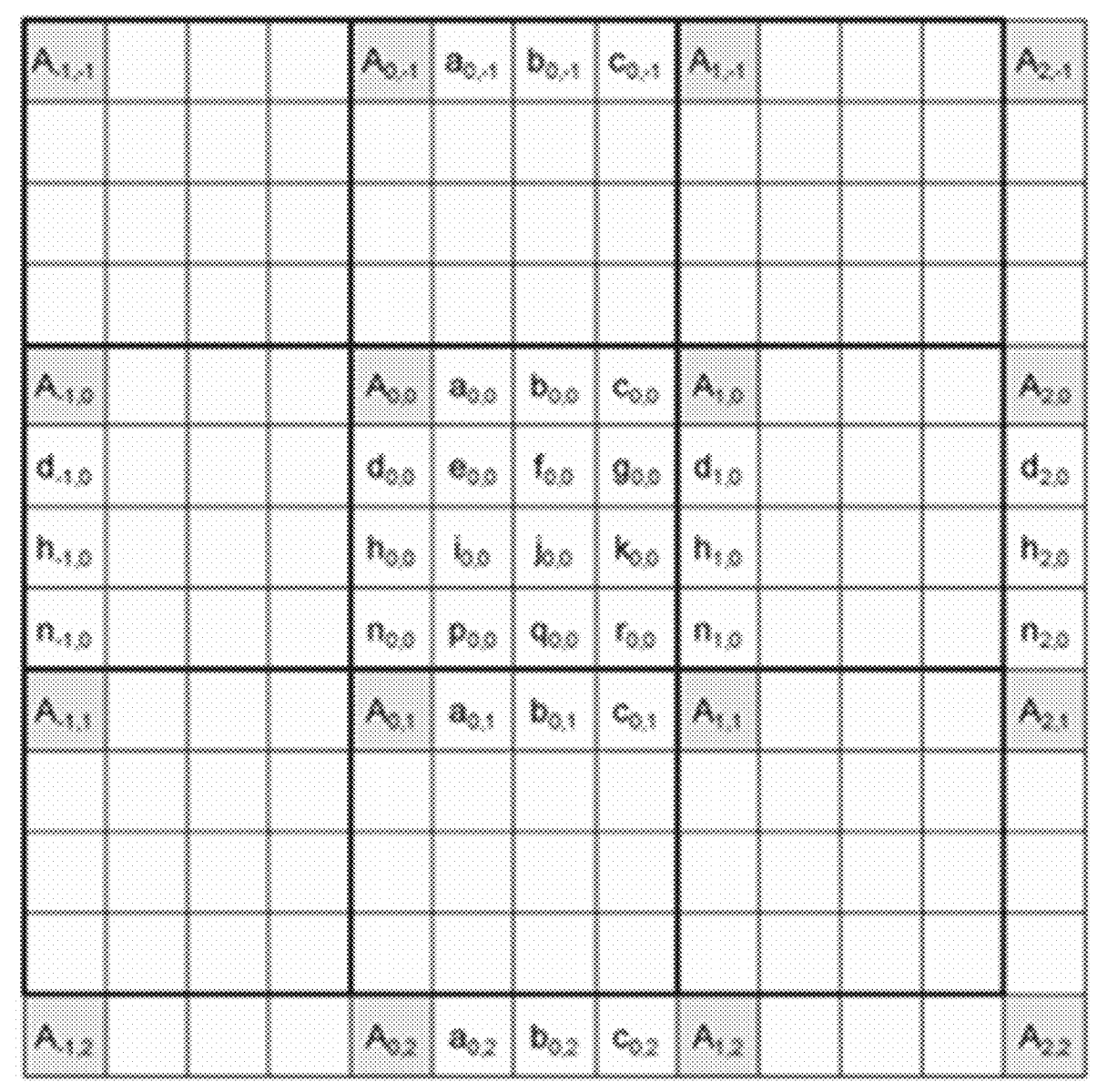

FIG. 8 is a conceptual diagram illustrating an example of integer and fractional sample positions according to aspects of the present disclosure. Referring to FIG. 8, pixel positions denoted as "A" are the integer pixels, half-pixel positions (locations) are denoted as b, h and j and all the quarter-pixel positions (locations) are denoted as a, c, d, e, f, g, i, k, n, p, q and r. In order to do half-pixel refinement with an 8-point square pattern, 3 planes are required, and similarly for quarter-pixel refinement 8 planes are required as per the HEVC standard. Newer standards are considering $\frac{1}{16}$th of pixel accurate interpolations.

When "A" is an integer pixel, pixel locations a, b and c require only horizontal interpolation, d, h and n require only vertical interpolation, all other points require both vertical and horizontal interpolations.

It is possible to use a different interpolation procedure during the integer pixel distance refinement and sub-pixel distance refinement than the interpolation used for the final motion compensated prediction process. For example, bilinear interpolation is a simpler interpolation that can be used for refinement while the final motion compensated prediction (MCP) may require a 2-D DCT based interpolation filter. The integer pixel grid data fetched from the reference frame buffers need to be retained in a first buffer in internal memory (e.g., SRAM) till all the interpolations can be completed in order to avoid re-fetching this data multiple times from an external memory (e.g., DDR). The integer pixel distance grid derived through interpolation of the integer pixel grid samples and required for the integer pixel distance refinement from the sub-pixel accurate refinement centers needs to be maintained in a second buffer in internal memory till all integer pixel distance refinements are completed. For half-pixel distance refinement around the best integer pixel distance position (which can be a sub-pixel position with respect to the integer pixel grid), given that the distance between the symmetric half-pixel refinement points on either side of the center are separated by 1 integer pixel distance, the 2 horizontal half-pixel distance positions share an interpolated plane, the 2 vertical half-pixel distance positions share an interpolated plane, and the 4 diagonal half-pixel distance positions share an interpolated plane.

When the interpolation for refinement is the same as the final MCP interpolation, it may be preferable to retain the integer pixel distance refinement data stored in the second buffer as the final MCP interpolation calculations can be avoided when the best integer pixel distance position turns out to be the best position after sub-pixel refinement. When the interpolations differ between the refinement and the final MCP, the second buffer can be overwritten with the interpolations for one of the three planes needed for half-pixel distance refinement.

In order to reduce the computational load and the internal memory need, some prior art evaluate only the 4 diagonal half-pixel distance positions while some other prior art evaluate only the horizontal and vertical only half-pixel distance positions. Thus the set of internal memory buffers required ranges from 2 (when diagonal half-pixel distance positions only are evaluated and the interpolations differ) to 5 (when evaluations are performed on all three half-pixel distance planes and the interpolations do not differ). While some prior art techniques perform additional quarter-pixel distance and one-eighth-pixel distance refinements, each position in these refinements requires individual interpolations, which are computationally prohibitive and not commensurate with the additional compression gains. When the interpolation uses higher tap filters, horizontal filtering is first performed and the filtered result is stored in a temporary buffer and then the vertical filtering is performed.

The present disclosure provides methods and apparatuses for deriving sub-pixel distance delta motion vectors around the best integer distance motion vectors during decoder side motion vector refinement/derivation without explicit refinement through error surface techniques that utilize the costs evaluated at integer pixel distance grid positions. A parametric error surface is fitted using these costs and the minimum position of the parametric error surface is obtained by solving a set of simultaneous equations. Aspects of the present disclosure utilize decoder-side sub-pixel distance refinement around an integer distance pixel position (which itself can be a sub-pixel position with respect to the integer pixel grid) and handling the different variants of decoder side motion vector refinement such as template matching, bilateral matching, and template based bilateral matching.

Given that decoder side motion vector refinement/derivation is a normative aspect of a coding system, the encoder will also have to perform the same error surface technique in order to not have any drift between the encoder's reconstruction and the decoder's reconstruction. Hence, all aspects of all embodiments of the present disclosure are applicable to both encoding and decoding systems.

In template matching, the refinement movement occurs only in the reference starting from the sub-pixel accurate center that is derived based on the explicitly signaled merge index or implicitly through cost evaluations.

In bilateral matching (with or without an averaged template), the refinements start in the reference lists L0 and L1 starting from the respective sub-pixel accurate centers that are derived based on the explicitly signaled merge index or implicitly through cost evaluations.

It should be noted that when a bilateral matching cost is evaluated based on equal and opposite horizontal and vertical displacements in reference list L1 for a given horizontal and vertical displacement in reference list L0, the positions shown in the figures are assumed to correspond to reference list L0 and the positions in reference list L1 are derived by negating the displacement in the horizontal and vertical directions with respect to the current iteration center in reference list L1.

Hence there is a need to realize most of the coding gains of explicit sub-pixel distance refinement without increasing the memory size and computational complexity.

Embodiment 1

Let N be the maximum number of integer 1-pixel distance refinement iterations that are allowed normatively. A first integer distance refinement iteration starts from the sub-pixel accurate center of refinement described previously and proceeds till either the center position has a lower evaluated cost function value than the evaluated cost function values of a prescribed set of 1-pixel neighbor positions or till the N number of iterations have been performed. When the N number of iterations is reached and the center position is not the position with the least (lowest) cost function value when compared to the set of its 1-pixel neighbor positions, error surface based sub-pixel refinement is not performed and the position with the least (lowest) cost function value across all the iterations is declared as the final delta motion vector from the decoder-side motion vector refinement process. When refinement exits with the center position having the least (lowest) cost function value in the exiting iteration's set of 1-pixel neighbor positions, the following error surface based sub-pixel refinement procedure is applied.

Figure 9:
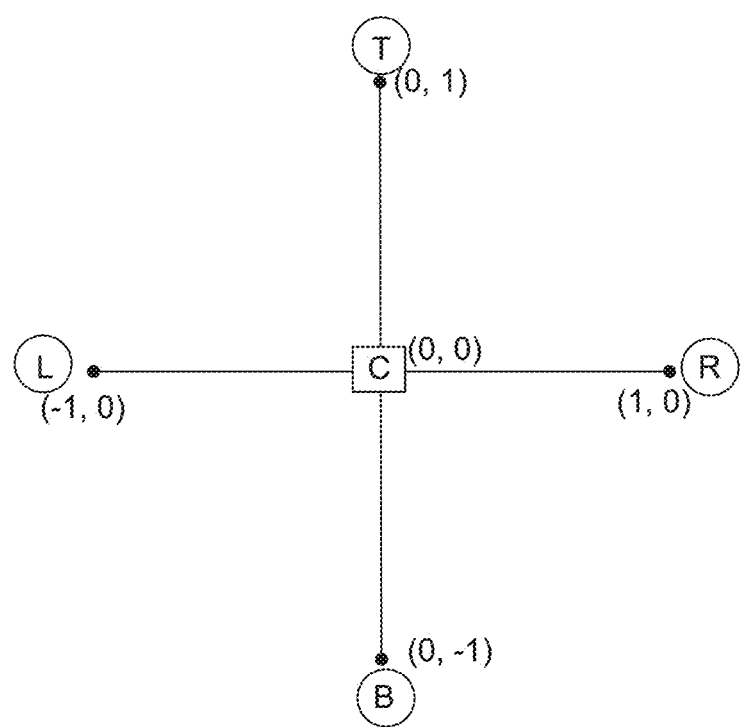
FIG. 9 is a block diagram of a set of 1-pixel neighbor positions around a center pixel for obtaining sub-pixel accurate delta motion vector refinement in one or more reference frames according to an embodiment of the present disclosure.

In the following, let the set of 1-pixel neighbor positions around the center C be its left (L), top (T), right (R), and bottom (B) integer 1-pixel distance. FIG. 9 is a block diagram of a set of 1-pixel neighbor positions around a center pixel for obtaining sub-pixel accurate delta motion vector refinement in one or more reference frames according to aspects of the present disclosure. Referring to FIG. 9, the origin of a 2-D coordinate system is at C, the coordinates at L, T, R, B correspond to (−1,0), (0,1), (1,0), and (0,−1). The evaluated cost function values at these 5 positions will be E(0,0), E(−1,0), E(0,1), E(1,0), and E(0,−1). A 5-parameter error surface using a 2-D parabolic function is defined as follows:

$$E(x,y)=A*(x-x0)^2+B*(y-y0)^2+C \qquad (1)$$

where E(x,y) is an evaluated cost function of Cartesian coordinates (x,y), (x0, y0) are Cartesian coordinates associated with (corresponding to) the sub-pixel displacement with respect to the center (0, 0) having the least (lowest) error, C is a parameter corresponding to the error at this position, and A and B are error surface model parameters. A, B and C are constant values for calculating E(x, y).

On the other hand, considering that A, B, C, x0 and y0 are unknown parameters, solving the 5 equations using the available evaluated cost function values at the 5 positions (0, 0), (−1, 0), (0, −1), (1, 0) and (0, 1), (x0, y0) can be computed (determined) as follows:

$$x0=(E(-1,0)-E(1,0))/(2*(E(-1,0)+E(1,0)-2*E(0,0))) \qquad (2)$$

$$y0=(E(0,-1)-E(0,1))/(2*(E(0,-1)+E(0,1)-2*E(0,0))) \qquad (3)$$

x0 and y0 are coordinates associated with the sub-pixel motion vector displacement. E(−1, 0), E(1, 0), E(0, 0), E(0, −1) and E(0, 1) are the integer distance costs corresponding to candidate integer motion vector displacements (−1, 0), (1, 0), (0, 0), (0, −1) and (0, 1) with respect to an initial motion vector, respectively. The coordinates x0 and y0 can be scaled by a scale factor N according to the sub-pixel accuracy of the delta motion vector, where, for example, N=2, 4, 8 and 16 for ½, ¼, ⅛ and 1/16 of a pixel accuracy, respectively.

In another embodiment, Equations (2) and (3) can be expressed as:

$$x0=(E(-1,0)-E(1,0))/(2*N*(E(-1,0)+E(1,0)-2*E(0,0))) \quad (2')$$

$$y0=(E(0,-1)-E(0,1))/(2*N*(E(0,-1)+E(0,1)-2*E(0,0))) \quad (3')$$

where, for example, N=1, 2, 4 and 8 for ½, ¼, ⅛ and 1/16 of a pixel accuracy, respectively.

Based on Equations (2) and (3), it is noted that x0 can be calculated (determined) only according to the positions (−1, 0), (1, 0) and (0, 0). Similarly, y0 can be calculated (determined) only according to the positions (0, −1), (0, 1) and (0, 0).

It is also noted that the parametric error surface cannot be fitted when the evaluated costs at all the 4 positions (−1, 0), (0,−1), (1, 0), and (0, 1) relative to the center (0, 0) (corresponding to the best integer-distance displacement relative to the initial motion vector) are not available. In such cases, no sub-pixel accurate delta displacement is added to the best integer-distance displacement.

Depending on the sub-pixel accuracy supported by the final motion compensation, the scale factor N can be appropriately chosen.

The sub-pixel motion vector displacements are bounded by −0.5 and +0.5 in the x and y directions as per the Equations (1), (2) and (3), and since accuracy of up to 1/16th pixel is usually of interest, the 2 divisions can be performed efficiently with only shift, comparison, and increment operations.

In some embodiments, the method for a decoder-side motion vector refinement includes determining a target integer motion vector displacement by comparing integer distance costs corresponding to candidate integer motion vector displacements with respect to an initial motion vector, determining a sub-pixel motion vector displacement by performing calculation on the integer distance costs, and determining a refined motion vector based on the target integer motion vector displacement, the sub-pixel motion vector displacement and the initial motion vector.

In one embodiment, the method may further include, prior to determining the sub-pixel motion vector displacement, determining whether a predetermined motion vector displacement comprises the target integer motion vector displacement; in the event that the predetermined motion vector displacement comprises the target integer motion vector displacement: determining the sub-pixel motion vector displacement by performing calculation on the integer distance costs. In another embodiment, the method may further include, prior to determining the sub-pixel motion vector displacement, determining whether evaluated costs are available at positions (−1,0), (0,−1), (1,0), and (0,1) relative to the target integer motion vector displacement; in the event that the evaluated costs are determined to be available at positions (−1,0), (0,−1), (1,0), and (0,1) relative to the target integer motion vector displacement, determining the sub-pixel motion vector displacement by performing calculations on the integer-distance costs.

In one embodiment, the method may further include, in the event that the predetermined motion vector displacement does not comprise the target integer motion vector displacement: calculating a refined motion vector based on the target integer motion vector displacement and the initial motion vector. In another embodiment, the method may further include, in the event that at least one or more of the evaluated costs are determined to be not available at positions (−1,0), (0,−1), (0,1), and (1,0) relative to the target integer motion vector displacement, calculating a refined motion vector based on the target integer motion vector displacement and the initial motion vector.

In one embodiment, determining the target integer motion vector displacement may include calculating an integer distance cost for each candidate integer motion vector displacement, and selecting a candidate integer motion vector displacement corresponding to a lowest integer distance cost as the target integer motion vector displacement.

In one embodiment, the target integer motion vector displacement includes a first motion vector displacement corresponding to a reference picture list L0, and a second motion vector displacement corresponding to a reference picture list L1. The method may further include: determining the first motion vector displacement by comparing integer costs corresponding to candidate integer motion vector displacements corresponding to the reference picture list L0, and determining the second motion vector displacement by negating the first motion vector displacement.

It is to be understood that the described embodiment is exemplary and not limiting, other 5-point, 6-point, and 9-point based error surface methods such as in reference documents can be employed if the integer distance refinement process results in these many evaluated cost function values within the 1-pixel neighborhood set.

The method according to the embodiment needs only 2 internal memory buffers. The first buffer is configured to store the integer pixel grid from the reconstructed picture buffer and the second buffer is configured to store the integer distance grid during the integer distance refinement (which is utilized for obtaining the parametric error surface) and can be used to over-write with the final sub-pixel accurate motion compensated prediction samples.

According to embodiments of the present disclosure, high precision sub-pixel accurate delta motion vectors are obtained without explicit refinement at any of the sub-pixel precision levels.

No extra interpolation or cost function evaluation computations are required beyond the computations required for the integer distance refinement iterations when the same cost function is used across all iterations.

Figure 10:
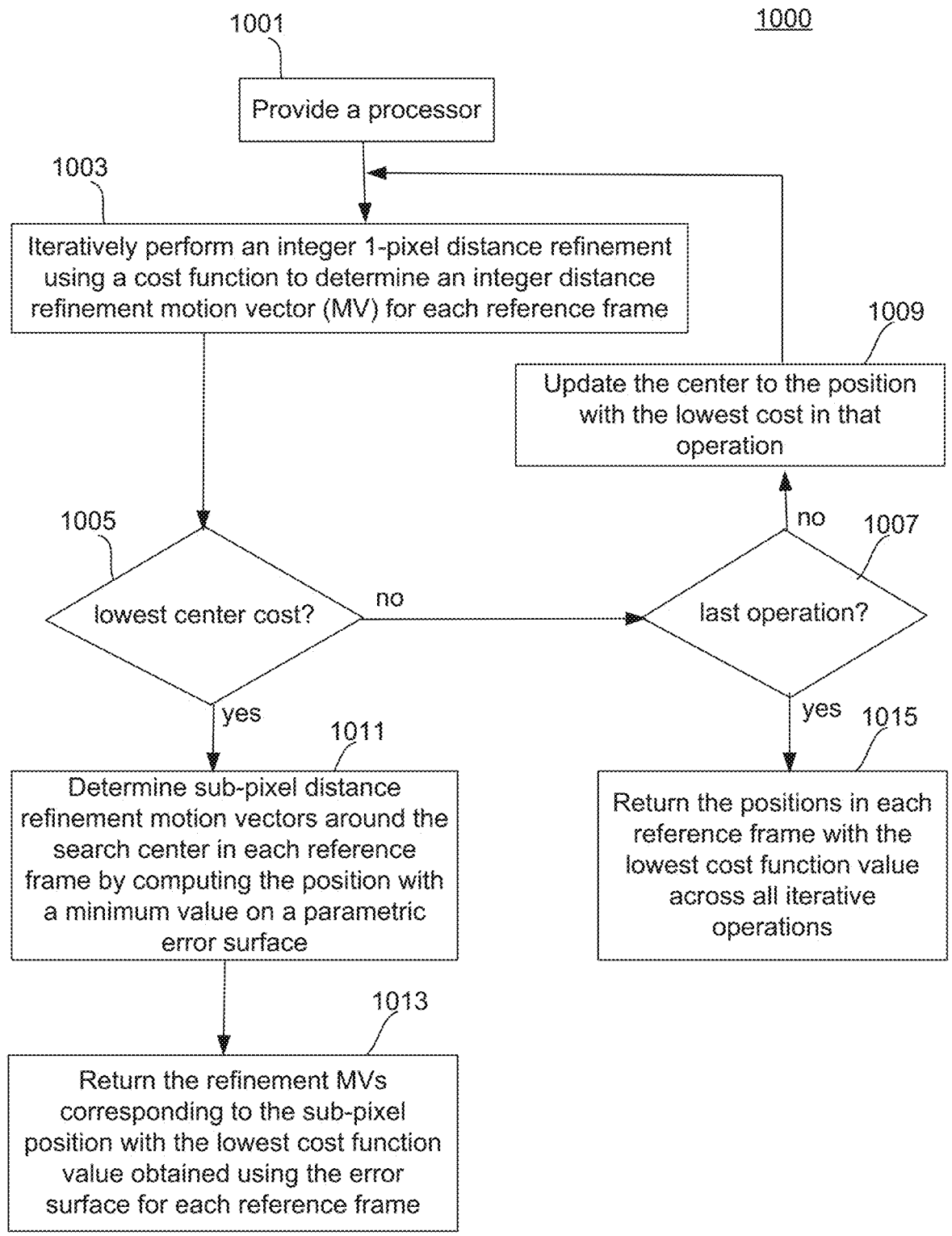
FIG. 10 is a simplified flow diagram illustrating a method for obtaining sub-pixel accurate delta motion vector refinement in one or more reference frames in a decoder-side motion vector refinement system according to some embodiments of the present disclosure.

FIG. 10 is a simplified flow diagram illustrating a method 1000 for obtaining a sub-pixel accurate delta motion vector in one or more reference frames in a decoder-side motion vector refinement system according to one embodiment of the present disclosure. The method 1000 may include the following steps:

Step 1001: providing a processor. The processor can be one or more processing units (CPU, DSP) integrated into a video encoder and/or decoder or program code integrated into video compression software to perform the method described herein.

Step 1003: initiating a loop by iteratively performing, by the processor, an integer 1-pixel distance refinement operations (iterations) using a cost function to determine an integer distance refinement motion vector for each reference frame of the one or more reference frames.

Step 1005: determining, by the processor, a cost function value of a position of a search center of a current operation against cost function value of a set of 1-pixel neighbor positions. In the event that the cost of the search center of the current iteration is determined to be the lowest; i.e., early exit from the iteration loop (1005, yes):

Step 1011: determining sub-pixel distance refinement motion vectors around the last search centers in each reference frame by computing a position with a minimum value on a parametric error surface fitted using the cost function values of the last search centers and the set of 1-pixel neighbors around it; and at the integer distance positions utilized for deriving the parametric error surface differ from the cost function evaluations performed during the earlier iterations of integer distance refinement, an extra set of cost function evaluations centered on the early exit center are performed with the required cost function.

The following Table 1 provides some situations during bilateral matching in which extra evaluations after early exit during integer distance refinement will be required.

TABLE 1

| Type of refinement used for integer distance refinement | Refinement type used for last iteration (or) on early exit of integer distance refinement to derive parametric error surface | Extra cost function evaluations required after early exit? |
|---|---|---|
| SBM_JOINT | SBM_JOINT | NO |
| SBM_JOINT | TBM_INDEPENDENT | YES |
| SBM_JOINT | TBM_IN_1REF_NEG_IN_OTHER | YES |
| TBM_INDEPENDENT | TBM_INDEPENDENT | NO |
| TBM_IN_1REF_NEG_N_OTHER | TBM_INDEPENDENT | YES |

Step 1013: returning a total refinement motion vector as a sum of the determined integer distance refinement motion vectors and the determined sub-pixel distance refinement motion vectors for each reference frame.

The method further includes: in the event that the cost function value of the position of the search center is not the lowest cost function value (1005, no), go to step (1007).

Step (1007): determining that the current operation is the last operation (iteration). In the event that the current operation is the last operation (1007, yes), returning the refinement motion vector corresponding to the position with the lowest cost value across all the operations (1015). In the event that the current operation is not the last operation (1007, no): updating the center to the position with the lowest cost in that last operation, and going back to the loop and repeating step (1003).

Embodiment 2

There are different variations of embodiment 1 when the cost function evaluations at the integer distance positions utilized for deriving the parametric error surface differ from the cost function evaluations performed during the earlier iterations of integer distance refinement.

For example, when bilateral matching is used, there are three types of refinements possible. The first refinement type is to perform a joint refinement in both the reference lists L0 and L1, in such a way that the displacements in the reference list L1 are equal and opposite in both the horizontal and vertical directions to the displacements in the reference list L0 (the first refinement type is referred to as SBM_JOINT). The second refinement type is to perform independent refinements in both the reference lists L0 and L1 against a common bilateral averaged template (the second refinement type is referred to as TBM_INDEPENDENT). The third refinement type is to perform refinement in the reference lists L0 or L1 against a bilateral averaged template and negate the estimated horizontal and vertical displacements when getting the displacement in the other reference list (L1 if L0 was used for refinement, and L0 if L1 was used for refinement. The third refinement type is referred to as TBM_IN_1REF_NEG_IN_OTHER).

Since it is difficult to anticipate the iteration in which the early exit from the iteration loop (due to center position's cost being lower than the surrounding set of 1-pixel neighbor costs) will occur, whenever the cost function evaluations It has been observed that the refinement type SBM_JOINT works best during the integer distance refinement iterations. A small additional coding gain is achieved when the refinement type TBM_INDEPENDENT is used to get independent sub-pixel delta motion vectors in L0 and L1, when compared to equal and opposite displacements in L0 and L1. However, the independent refinement in L0 and L1 requires cost evaluations in L0 and L1 positions independently and hence is computationally more complex than the joint equal and opposite displacement estimation option (SBM_JOINT refinement). In addition to the SBM_JOINT refinement, an early exit does not require additional cost function evaluations.

Figure 11:
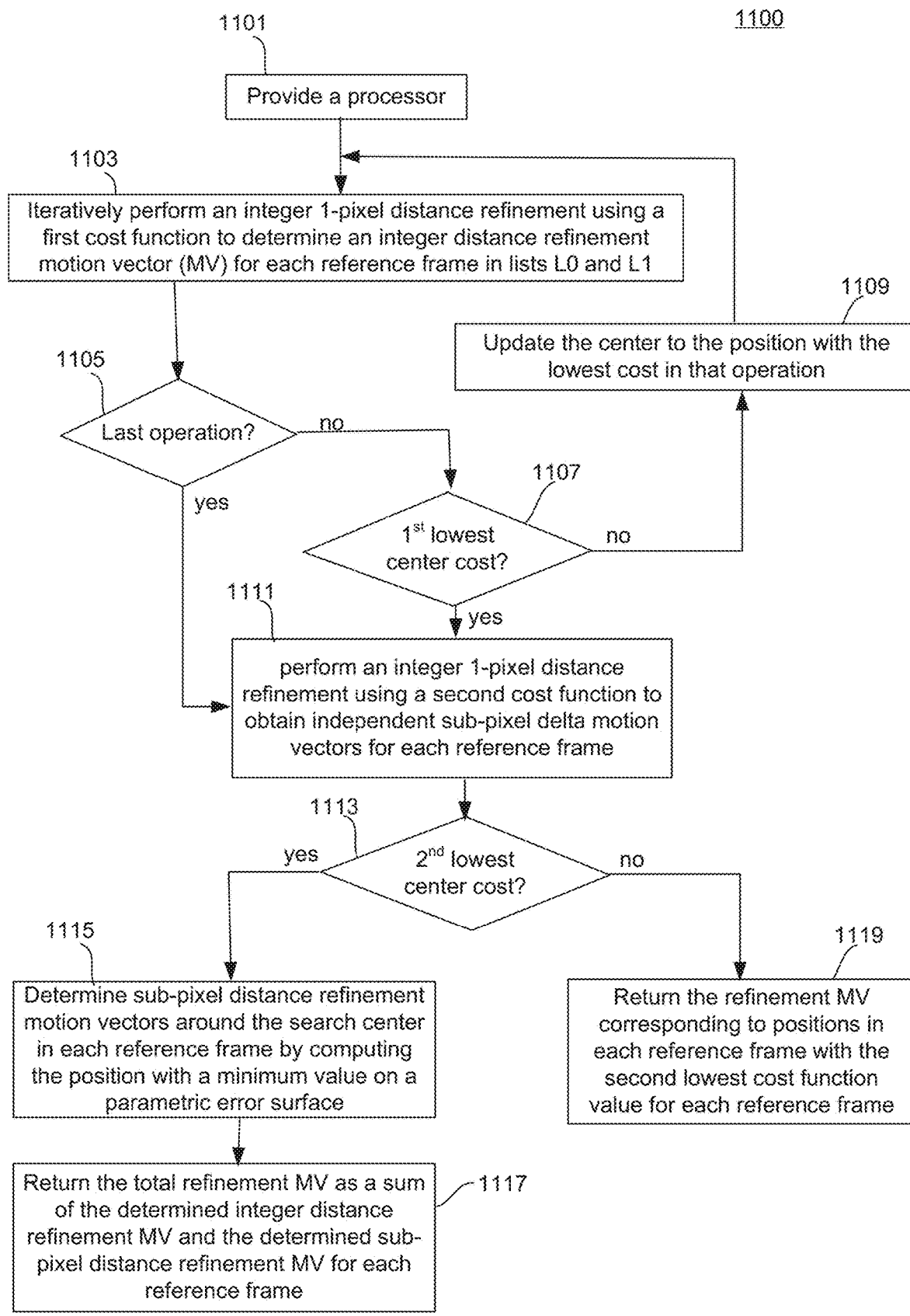
FIG. 11 is a simplified flow diagram illustrating a method for implementing an embodiment of the present disclosure.

FIG. 11 is a simplified flow diagram illustrating a method 1100 for obtaining a sub-pixel accurate delta motion vector in one or more reference frames around their respective initial sub-pixel accurate refinement center(s) in a decoder-side motion vector refinement system according to one embodiment of the present disclosure. The method 1100 may include the following steps:

Step 1101: providing a processor. The processor can be one or more processing units (CPU, DSP) integrated into a video encoder and/or decoder or program code integrated into video compression software to perform the method described herein.

Step 1103: iteratively performing, by the processor, an integer 1-pixel distance refinement operations (iterations) using a cost function to determine an integer distance refinement motion vector for each reference frame of the one or more reference frames.

Step 1105: determining whether a current operation is a last operation. In the event that the current operation is the last operation (1105, yes):

Step 1111: performing an integer 1-pixel distance refinement using a second cost function to obtain independent sub-pixel delta motion vectors for each reference frame of the one or more reference frames.

In the event that the current operation is not the last operation (1105, no), go to step 1107.

Step 1107: determining whether a cost function value of the position of the search center of a current operation is the lowest cost function value in a set of 1-pixel neighbor positions. In the event that the cost function value of the position of the search center is the lowest cost function value (1107, yes): go to step 1111 (i.e., early exit of the iteration loop.) In the event that the cost function value of the position of the search center is not the lowest cost function value (1107, no): go to step 1109.

Step 1109: updating the center to the position with the lowest cost value in that operation and go back to the loop for performing a next integer 1-pixel distance refinement operation.

Step 1111: performing an integer 1-pixel distance refinement using a second cost function to obtain independent sub-pixel delta motion vectors for each reference frame of the one or more reference frames.

Step 1113: determining whether the last search center position has the lowest second cost function value against the second cost function values at a set of 1-pixel neighbors to the last search center. In the event that the last search center position has the lowest second cost function value (1113, yes):

Step 1115: determining sub-pixel distance refinement motion vectors around the best integer distance refinement position in each reference frame by computing the position with a minimum value on a parametric error surface fitted using the second cost function values.

Step 1117: returning the total refinement MV as a sum of the determined integer distance refinement MV and the determined sub-pixel distance refinement MV for each reference frame.

Embodiments of the present disclosure also provide apparatuses configured to perform the methods described above. The apparatuses may be a combination of software and hardware. For example, the encoding and/or decoding may be performed by a chip such as a general purpose processor (CPU), or a digital signal processor (DSP), or a field programmable gate array (FPGA), or the like. However, embodiments of the present disclosure are not limited to a programmable hardware implementation. Some embodiments of the present disclosure may be implemented using an application-specific integrated circuit (ASIC) or a combination of the above mentioned hardware components.

The encoding and/or decoding may also be implemented by program instructions or program code stored on a computer readable medium. The program instructions, when executed by a processor or computer, causes the processor or computer to perform the steps of the above described methods. The computer readable medium can be any medium on which the program code is stored such as a DVD, CD, USB (flash) drive, hard disc, server storage available via a network, and the like.

Figure 12:
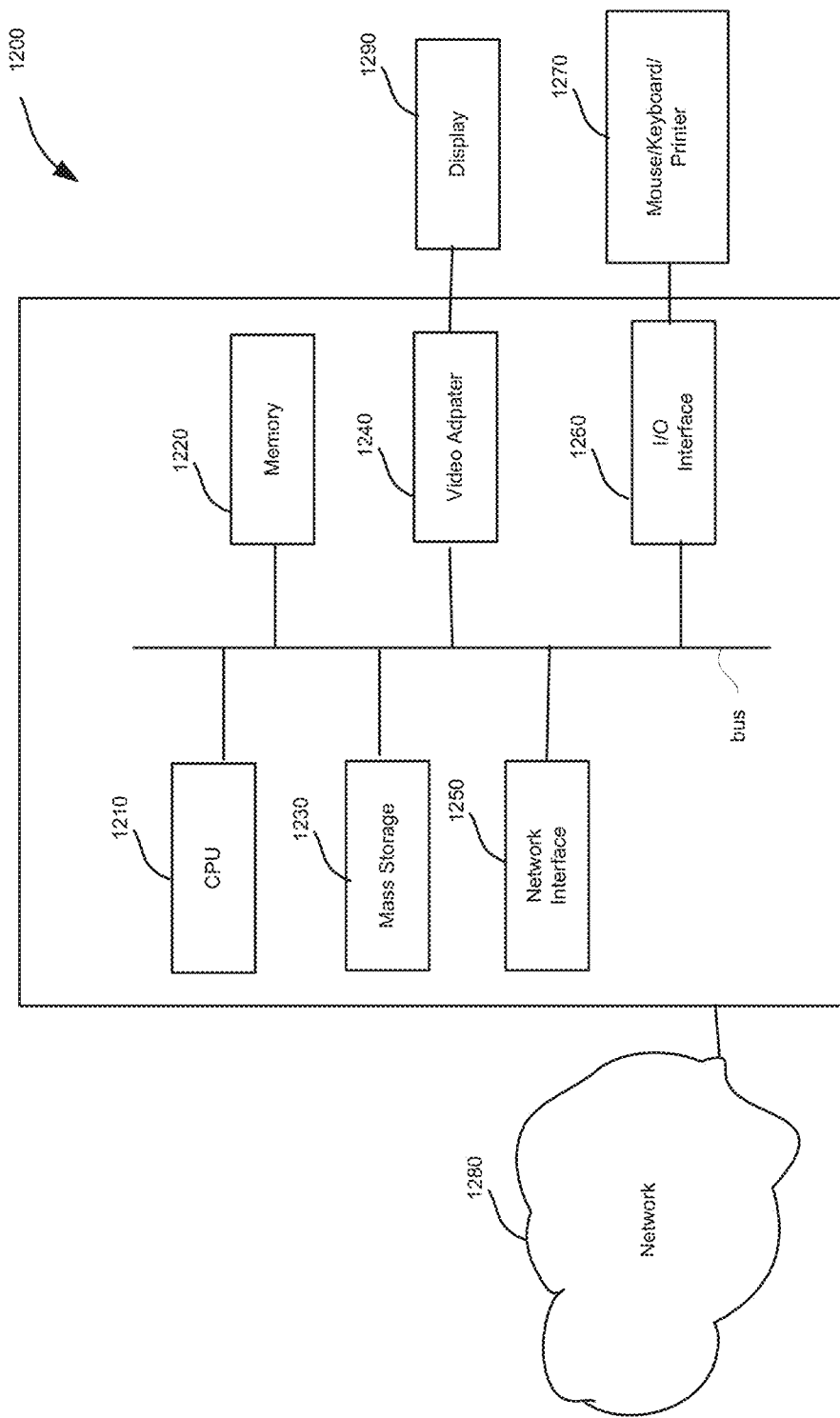
FIG. 12 is a block diagram of an apparatus that can be used to implement various embodiments of the present disclosure.

FIG. 12 is a block diagram of an apparatus 1200 that can be used to implement various embodiments of the present disclosure. The apparatus 1200 may be encoding apparatus 100 shown in FIG. 1 and decoding apparatus 200 shown in FIG. 2. Additionally, the apparatus 1200 can host one or more of the described elements. In some embodiments, the apparatus 1200 is equipped with one or more input/output devices, such as a speaker, microphone, mouse, touchscreen, keypad, keyboard, printer, display, and the like. The apparatus 1200 may include one or more central processing units (CPUs) 1210, a memory 1220, a mass storage 1230, a video adapter 1240, and an I/O interface 1260 connected to a bus. The bus is one or more of any type of several bus architectures including a memory bus or memory controller, a peripheral bus, a video bus, or the like.

The CPU 1210 may have any type of electronic data processors. Memory 1220 may have, or be, any type of system memory such as static random access memory (SRAM), dynamic random access memory (DRAM), synchronous DRAM (SDRAM), read-only memory (ROM), a combination thereof, or the like. In an embodiment, memory 1220 may include ROM for use at boot-up, and DRAM for program and data storage for use while executing programs. In some embodiments, memory 1220 may be non-transitory. The mass storage 1230 may include any type of storage device that stores data, programs, and other information and to make the data, programs, and other information accessible via the bus. The mass storage 1230 includes, for example, one or more of a solid state drive, hard disk drive, a magnetic disk drive, an optical disk drive, or the like configured to store program code, when executed by the CPU 1210, causes the CPU to perform the methods described herein. The CPU 1210 can be configured to iteratively over a number of operations the steps described in connection with FIGS. 10 and 11. The CPU 1210 may include a reference selection unit configured to select a first reference picture to which MV0 points and a second reference picture to which MV1 points. After the selection of the reference picture, the reference picture selection unit may determine whether the first reference picture or the second reference picture is used for performing motion vector refinement.

The video adapter 1240 and I/O interface 1260 provide interfaces to couple external input and output devices to the apparatus 1200. For example, the apparatus 1200 may provide SQL command interface to clients. As illustrated, examples of input and output devices include a display 1290 coupled to video adapter 1240 and any combination of mouse/keyboard/printer 1270 coupled to the I/O interface 1260. Other devices may be coupled to the apparatus 1200, and additional or fewer interface cards may be utilized. For example, a serial interface card (not shown) may be used to provide a serial interface for a printer.

The apparatus 1200 may also include one or more network interfaces 1250, which includes wired links, such as an Ethernet cable or the like, and/or wireless links to access nodes or one or more networks 1280. The network interface 1250 allows the apparatus 1200 to communicate with remote units via networks 1280. For example, the network interface 1250 may provide communication to a database. In an embodiment, the apparatus 1200 is coupled to a local-area network or a wide-area network for data processing and communications with remote devices, such as other processing units, the Internet, remote storage facilities, or the like. The apparatus 1200 can be used for encoding one or more picture blocks received from an input (e.g., network interface) and/or decoding a video picture from a bitstream. The apparatus 1200 may include a bitstream parser configured to extract compressed picture blocks from the bitstream, a motion vector refinement unit configured to obtain sub-pixel accurate delta motion vector refinement, and a reconstruction unit configured to perform block reconstruction based on the obtained motion vectors.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The above mentioned circuitry may also be a single integrated chip. However, the present invention is not limited thereto and the circuitry may include different pieces or hardware or a combination of hardware and software such as a general purpose processor or DSP programmed with the corresponding code.

The flowcharts described above are intended to illustrate examples of decoder-side motion vector refinement techniques. A person skilled in the art may modify the steps or combine the steps to implement the present disclosure without departing from the scope of the present disclosure.

In one aspect of the present disclosure, a method for obtaining a sub-pixel accurate delta motion vector refinement in one or more reference frames in a decoder-side motion vector refinement system is provided. The method may include:

providing a processor (1001);
starting a loop operation by iteratively performing (1003), by the processor, an integer 1-pixel distance refinement operation using a cost function to determine an integer distance refinement motion vector for each reference frame of the one or more reference frames;
determining, by the processor, whether a cost function value of a position of a search center is a lowest function value in a set of 1-pixel neighbor positions (1005);
in the event that the cost function value of the position of the search center is the lowest cost function value (1005, yes): exiting the loop operation;
determining sub-pixel distance refinement motion vectors around the search center in each reference frame by computing a position with a minimum value on a parametric error surface fitted using a cost function value of the search center and the set of 1-pixel neighbor positions (1011); and returning a sub-pixel position obtained using the parametric error surface for each reference frame (1013).

In one embodiment, the method may further includes: in the event that the cost function value of the position of the search center is not the lowest cost function value (1005, no);
determining whether a current operation is a last operation (1007);
in the event that the current operation is the last operation (1007, yes):
returning positions in each reference frame with the lowest cost function (1015); and
in the event that the current operation is not the last operation (1007, no):
updating (1009), by the processor, the position of the search center of the current integer 1-pixel distance refinement operation by a position having a lowest cost in the current operation; and repeating the loop operation (1003, 1005, 1007, 1009).

In one embodiment, the parametric error surface comprises 5 pixels arranged in a center pixel surrounded by four peripheral pixels spaced apart from the center pixel at equal distance.

In one embodiment, the cost function is calculated by the following expression:

$$E(x,y)=A*(x-x0)2+B*(y-y0)2+C;$$

where E(x, y) is an evaluated cost function value of coordinates (x, y), x0 and y0 are coordinates associated with a sub-pixel displacement with respect to a center (0, 0) with a least error, C is a parameter associated with an error at coordinates (x0, y0), A and B are constant values, x and y are coordinates associated with neighbor positions, and x and y each are integer including −1, 0, and 1.

In one embodiment, the sub-pixel position is obtained by the following expressions:

$$x0=(E(-1,0)-E(1,0))/(2*N*(E(-1,0)+E(1,0)-2*E(0,0))); \text{ and}$$

$$y0=(E(0,-1)-E(0,1))/(2*N*(E(0,-1)+E(0,1)-2*E(0,0))),$$

wherein, $$E(x,y)=A*(x-x0)2+B*(y-y0)2+C;$$

E(x, y) is an evaluated cost function value, x0 and y0 are coordinates associated with a sub-pixel displacement with respect to a center (0, 0) with a least error, C is a parameter associated with an error at coordinates (x0, y0), A and B are constant values, x and y are coordinates associated with neighbor positions, x and y each are integer including −1, 0, and 1, and N is an integer of 1, 2, 4, or 8 for a one-half, one-quarter, one-eight, or one-sixteenth of sub-pixel accuracy.

In one embodiment, the sub-pixel accurate delta motion vector refinement is obtained by template matching.

In another aspect of the present disclosure, an apparatus for obtaining sub-pixel accurate delta motion vector in one or more reference frames in a decoder-side motion vector refinement system is provided. The apparatus includes a processing unit and a non-transitory computer readable medium having computer readable instructions therein for causing the processing unit to perform steps of:
starting a loop operation by iteratively performing a number N of integer 1-pixel distance refinement operations using a cost function to determine an integer distance refinement motion vector for each reference frame, wherein a position of a search center of a current iteration is updated by a position with a lowest cost in a previous operation;

determining whether a cost of the position of the search center is lower than any cost of a set of 1-pixel neighbor positions;
in the event that the cost of the position of the search center is the lowest coast;
exiting the loop operation;
determining sub-pixel distance refinement motion vectors around the search center in each reference frame by computing the position with a minimum value on a parametric error surface fitted using the cost function value of the search center and the set of 1-pixel neighbor positions; and
returning a sub-pixel position obtained using the parametric error surface for each reference frame.

In one embodiment, the non-transitory computer readable medium having computer readable instructions therein further causes the processing unit to perform steps of:
in the event that the cost function value of the position of the search center is not the lowest cost function value (1005, no): determining whether a current operation is a last operation;
in the event that the current operation is the last operation: returning positions in each reference frame with the lowest cost function; and
in the event that the current operation is not the last operation: updating (1009), by the processor, the position of the search center of the current integer 1-pixel distance refinement operation by a position having the lowest cost in a current refinement operation; and repeating the loop operation.

In one embodiment, the cost function is calculated by the following expression:

$$E(x,y)=A*(x-x0)2+B*(y-y0)2+C;$$

where E(x, y) is an evaluated cost function value, x0 and y0 are coordinates associated with a sub-pixel displacement with respect to a center (0, 0) with a least error, C is a parameter associated with an error at coordinates (x0, y0), A and B are constant values, x and y are coordinates associated with neighbor positions, and x and y each are integer including −1, 0, and 1.

In one embodiment, the sub-pixel position is obtained by the following expression:

$$x0=(E(-1,0)-E(1,0))/(2*N*(E(-1,0)+E(1,0)-2*E(0,0))); \text{ and}$$

$$y0=(E(0,-1)-E(0,1))/(2*N*(E(0,-1)+E(0,1)-2*E(0,0))),$$

wherein, $$E(x,y)=A*(x-x0)2+B*(y-y0)2+C;$$

E(x, y) is an evaluated cost function value, x0 and y0 are coordinates associated with a sub-pixel displacement with respect to a center (0, 0) with a least error, C is a parameter associated with an error at coordinates (x0, y0), A and B are constant values, x and y are coordinates associated with neighbor positions, x and y each are integer including −1, 0, and 1, and N is an integer of 1, 2, 4, or 8 for a one-half, one-quarter, one-eight, or one-sixteenth of sub-pixel accuracy.

Another aspect of the present disclosure provides a method for obtaining a sub-pixel accurate delta motion vector refinement in one or more reference frames in a reference list L0 and in a reference list 1 in a decoder-side motion vector refinement system. The method may include:
providing a processor (1101);
starting a loop operation by iteratively performing (1103), by the processor, an integer 1-pixel distance refinement operation using a first cost function to determine an integer distance refinement motion vector for each reference frame of the one or more reference frames;
determining whether a current operation is a last operation (1105);
in the event that the current operation is the last operation (1105, yes):
performing an integer 1-pixel distance refinement using a second cost function to obtain independent sub-pixel delta motion vectors for each reference frame (1111);
in the event that the current operation is not the last operation (1105, no);
determining, by the processor, whether a cost function value of the position of the search center of a current operation is a first lowest function value in a set of 1-pixel neighbor positions (1107);
in the event that the cost function value of the position of the search center is the first lowest function value (1107, yes):
exiting the loop operation;
performing the integer 1-pixel distance refinement using the second cost function to obtain independent sub-pixel delta motion vectors for each reference frame (1111);
in the event that the cost function value of the position of the search center of the current operation is not the first lowest function value (1107, no):
updating the center to the position with the first lowest cost of the current operation; and repeating the loop operation (1103, 1105, 1107, 1109).

In one embodiment, the method may further include:
determining, by the processor, whether a second cost function value of the position of the search center of the obtained independent sub-pixel delta motion vectors is the second lowest function value (1113);
in the event that the second cost function value is the lowest cost function value (1113, yes);
determining sub-pixel distance refinement motion vectors around the search center in each reference frame by computing a position with a minimum value on a parametric error surface fitted using a cost function value of the search center and the set of 1-pixel neighbor positions (1115); and
returning a total refinement motion vector as a sum of the determined integer distance refinement motion vector and the determined sub-pixel distance refinement motion vector for each reference frame obtained using the parametric error surface for each reference frame (1117);
in the event that the second cost function value is not the second lowest cost function value (1113, no);
returning the refinement motion vector corresponding to positions in each reference frame with the second lowest cost function value (1119).

In one embodiment, the sub-pixel position is derived by the following:

$$x0=(E(-1,0)-E(1,0))/(2*N*(E(-1,0)+E(1,0)-2*E(0,0)))$$

$$y0=(E(0,-1)-E(0,1))/(2*N*(E(0,-1)+E(0,1)-2*E(0,0)))$$

wherein, $$E(x,y)=A*(x-x0)2+B*(y-y0)2+C;$$

(x0, y0) corresponds to the sub-pixel displacement with respect to (0, 0) with the least error and C corresponds to the error at (x0, y0), A and B are constant numbers, (x,y) corresponds the neighbor positions, x includes −1,0,1, y includes −1,0,1.

In one embodiment, each of the first cost function and the second cost function is calculated by the following expression:

$$E(x,y)=A*(x-x0)2+B*(y-y0)2+C;$$

where E(x, y) is an evaluated cost function value, x0 and y0 are cartesian coordinates associated with a sub-pixel displacement with respect to a center (0, 0) with a least error, C is a parameter associated with an error at cartesian coordinates (x0, y0), A and B are constant values, x and y are cartesian coordinates associated with neighbor positions, and x and y each are integer including −1, 0, and 1.

In one embodiment, the sub-pixel accurate delta motion vector refinement is obtained by a bilateral matching.

In one embodiment, the bilateral matching includes performing a joint refinement in both the reference list L0 and the reference list L1.

In one embodiment, the bilateral matching includes performing an independent joint refinement in both the reference list L0 and the reference list L1 in relation to a common bilateral averaged template.

In one embodiment, the bilateral matching includes: performing s refinement either in the reference list L0 or in the reference list L1 in relation to a common bilateral averaged template, and negating estimated horizontal and vertical displacements when obtaining a displacement in other reference list.

In summary, embodiments of the present disclosure relate to motion vector determination based on template matching for bi-directional motion vector estimation. In particular, a block template is constructed as an average of blocks pointed to by initial motion vectors to be refined. Then, the motion vector refinement is performed by template matching in two different reference pictures. The matching is performed by finding an optimum (minimum or maximum, depending on the function) of a matching function corresponding to the best matching block in each of the two reference pictures. The optimum is searched for zero-mean template and a zero-mean candidate block (among the block positions pointed to by the motion vector candidates of the search space). In other words, before performing the function optimization, a mean of the template is subtracted from the template and a mean of the candidate block is subtracted from the candidate block. The predictor of the current block is then calculated as a weighted average of the best matching blocks in the respective reference pictures.

What is claimed is:

1. A decoder-side motion vector refinement method for refining a motion vector for a block of a frame in a video, the method comprising:
    determining a target integer motion vector displacement by comparing integer distance costs associated with respective candidate integer motion vector displacements with respect to an initial motion vector for the block;
    determining a sub-pixel motion vector displacement for the motion vector based on the target integer motion vector displacement and the integer distance costs, wherein:

$$x0=(E(-1,0)-E(1,0))/(2\times(E(-1,0)+E(1,0)-2\times E(0,0))),$$
    and $$y0=(E(0,-1)-E(0,1))/(2\times(E(0,-1)+E(0,1)-2\times E(0,0))),$$

wherein:
    x0 and y0 are coordinates associated with the sub-pixel motion vector displacement relative to a center (0, 0), and
    E(−1, 0), E(1, 0), E(0, 0), E(0, −1) and E(0, 1) are the integer distance costs with respect to the initial motion vector and corresponding to candidate integer motion vector displacements represented by coordinates (−1, 0), (1, 0), (0, 0), (0, −1) and (0, 1), respectively, relative to the center (0,0); and
    the center (0,0) represents an integer motion vector displacement among the candidate integer motion vector displacements that has the lowest integer distance cost;
    determining a refined motion vector based on the target integer motion vector displacement, the sub-pixel motion vector displacement and the initial motion vector.

2. The method of claim 1, wherein the target integer motion vector displacement comprises a first motion vector displacement corresponding to a first reference picture list, and a second motion vector displacement corresponding to a second reference picture list, the method further comprising:
    determining the first motion vector displacement by comparing the integer distance costs associated with the respective candidate integer motion vector displacements corresponding to the first reference picture list; and
    determining the second motion vector displacement by negating the first motion vector displacement.

3. The method of claim 1, wherein x0 is determined by performing at least one of a shift operation, a comparison operation, or an increment operation on E (−1, 0), E(1, 0) and E(0, 0).

4. The method of claim 1, wherein y0 is determined by performing at least one of a shift operation, a comparison operation, or an increment operation on E(0, −1), E(0, 1) and E(0, 0).

5. The method of claim 1, wherein the sub-pixel motion vector displacement is bounded between −0.5 and +0.5 pixel.

6. The method of claim 1, further comprising, prior to determining the sub-pixel motion vector displacement:
    determining whether the integer distance costs are available at a predetermined set of positions relative to the target integer motion vector displacement; and
    in the event that the integer distance costs are available at the predetermined set of positions relative to the target integer motion vector displacement, determining the sub-pixel motion vector displacement by performing calculation on the integer distance costs.

7. The method of claim 6, further comprising:
    in the event that the integer distance costs are not available at the predetermined set of positions relative to the target integer motion vector displacement, calculating the refined motion vector based on the target integer motion vector displacement and the initial motion vector.

8. The method of claim 1, wherein determining the target integer motion vector displacement comprising:
    calculating an integer distance cost for each candidate integer motion vector displacement in a plurality of candidate integer motion vector displacements; and
    selecting a candidate integer motion vector displacement corresponding to a lowest integer distance cost as the target integer motion vector displacement.

9. An apparatus comprising:
an input for receiving encoded video data;
an entropy decoding unit configured to decode the received encoded video data to obtain decoded data; and
one or more processors coupled to the entropy decoding unit and configured to:
determine a target integer motion vector displacement by comparing integer distance costs associated with respective candidate integer motion vector displacements with respect to an initial motion vector for a block of a frame in a video;
determine a sub-pixel motion vector displacement based on the target integer motion vector displacement and the integer distance costs,
wherein:

$$x0=(E(-1,0)-E(1,0))/(2\times(E(-1,0)+E(1,0)-2\times E(0,0))),$$
and $$y0=(E(0,-1)-E(0,1))/(2\times(E(0,-1)+E(0,1)-2\times E(0,0))),$$

wherein:
x0 and y0 are coordinates associated with the sub-pixel motion vector displacement relative to a center (0, 0), and
E(−1, 0), E(1, 0), E(0, 0), E(0, −1) and E(0, 1) are the integer distance costs with respect to the initial motion vector and corresponding to candidate integer motion vector displacements represented by coordinates (−1, 0), (1, 0), (0, 0), (0, −1) and (0, 1), respectively, relative to the center (0,0); and
the center (0,0) represents an integer motion vector displacement among the candidate integer motion vector displacements that has the lowest integer distance cost;
determine a refined motion vector based on the target integer motion vector displacement, the sub-pixel motion vector displacement and the initial motion vector.

10. The apparatus of claim 9, wherein the target integer motion vector displacement comprises a first motion vector displacement corresponding to a first reference picture list, and a second motion vector displacement corresponding to a second reference picture list, and wherein the one or more processors is further configured to:
determine the first motion vector displacement by comparing the integer distance costs associated with the respective candidate integer motion vector displacements corresponding to the first reference picture list; and
determine the second motion vector displacement by negating the first motion vector displacement.

11. The apparatus of claim 9, wherein x0 is determined by performing at least one of a shift operation, a comparison operation, or an increment operation on E (−1, 0), E(1, 0) and E(0, 0).

12. The apparatus of claim 9, wherein y0 is determined by performing at least one of a shift operation, a comparison operation, or an increment operation on E(0, −1), E(0, 1) and E(0, 0).

13. The apparatus of claim 9, wherein the sub-pixel motion vector displacement is bounded between −0.5 and +0.5 pixel.

14. The apparatus of claim 9, wherein the one or more processors is further configured to:
prior to determining the sub-pixel motion vector displacement, determine whether the integer distance costs are available at a predetermined set of positions relative to the target integer motion vector displacement; and
in the event that the integer distance costs are available at the predetermined set of positions relative to the target integer motion vector displacement, determine the sub-pixel motion vector displacement by performing calculation on the integer distance costs.

15. The apparatus of claim 14, wherein the one or more processors is further configured to:
in the event that the integer distance costs are not available at the predetermined set of positions relative to the target integer motion vector displacement, calculate the refined motion vector based on the target integer motion vector displacement and the initial motion vector.

16. The apparatus of claim 9, wherein the one or more processors determine the target integer motion vector displacement by:
calculating an integer distance cost for each candidate integer motion vector displacement in a plurality of candidate integer motion vector displacements; and
selecting a candidate integer motion vector displacement corresponding to a lowest integer distance cost as the target integer motion vector displacement.

17. A non-transitory computer-readable medium storing instructions which, when executed by one or more processors, cause the one or more processors to perform operations comprising:
determining a target integer motion vector displacement by comparing integer distance costs associated with respective candidate integer motion vector displacements with respect to an initial motion vector for a block of a frame in a video;
determining a sub-pixel motion vector displacement based on the target integer motion vector displacement and the integer distance costs,
wherein the sub-pixel motion vector displacement meets:

$$x0=(E(-1,0)E(1,0))/(2\times(E(-1,0)+E(1,0)2\times E(0,0))),$$
and $$y0=(E(0,-1)-E(0,1))/(2\times(E(0,-1)+E(0,1)-2\times E(0,0))),$$

wherein:
x0 and y0 are coordinates associated with the sub-pixel motion vector displacement relative to a center (0, 0), and
E(−1, 0), E(1, 0), E(0, 0), E(0, −1) and E(0, 1) are the integer distance costs with respect to the initial motion vector and corresponding to candidate integer motion vector displacements represented by coordinates (−1, 0), (1, 0), (0, 0), (0, −1) and (0, 1), respectively, relative to the center (0,0); and
the center (0,0) represents an integer motion vector displacement among the candidate integer motion vector displacements that has the lowest integer distance cost;
determining a refined motion vector based on the target integer motion vector displacement, the sub-pixel motion vector displacement and the initial motion vector.

18. The non-transitory computer-readable medium of claim 17, wherein the target integer motion vector displacement comprises a first motion vector displacement corresponding to a first reference picture list, and a second motion vector displacement corresponding to a second reference picture list, and wherein the operations further comprise:

determining the first motion vector displacement by comparing the integer distance costs associated with the respective candidate integer motion vector displacements corresponding to the first reference picture list; and determining the second motion vector displacement by negating the first motion vector displacement.

19. The non-transitory computer-readable medium of claim 17, wherein x0 is determined by performing at least one of a shift operation, a comparison operation, or an increment operation on E (−1, 0), E(1, 0) and E(0, 0).

20. The non-transitory computer-readable medium of claim 17, wherein y0 is determined by performing at least one of a shift operation, a comparison operation, or an increment operation on E(0, −1), E(0, 1) and E(0, 0).

* * * * *